US008765327B2

(12) United States Patent
Haug et al.

(10) Patent No.: US 8,765,327 B2
(45) Date of Patent: Jul. 1, 2014

(54) FUEL CELL ELECTRODES WITH CONDUCTION NETWORKS

(75) Inventors: Andrew T. Haug, St. Paul, MN (US); Steven J. Hamrock, Stillwater, MN (US); Gregory M. Haugen, Edina, MN (US); Mark A. Schonewill, Bloomington, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 403 days.

(21) Appl. No.: 12/834,531

(22) Filed: Jul. 12, 2010

(65) Prior Publication Data

US 2012/0009503 A1      Jan. 12, 2012

(51) Int. Cl.
*H01M 4/86* (2006.01)

(52) U.S. Cl.
USPC ........................................................ 429/530

(58) Field of Classification Search
None
See application file for complete search history.

(56) References Cited

U.S. PATENT DOCUMENTS

| 5,879,827 | A |  | 3/1999 | Debe |  |
|---|---|---|---|---|---|
| 2002/0127452 | A1 | * | 9/2002 | Wilkinson et al. | 429/32 |
| 2004/0043282 | A1 |  | 3/2004 | Kelley |  |
| 2005/0001357 | A1 | * | 1/2005 | Fujiwara et al. | 264/331.11 |
| 2005/0186467 | A1 | * | 8/2005 | Sugiura | 429/42 |
| 2005/0277007 | A1 | * | 12/2005 | Yoshitake et al. | 429/32 |
| 2006/0105226 | A1 |  | 5/2006 | Kim |  |
| 2008/0020261 | A1 | * | 1/2008 | Hendricks et al. | 429/40 |
| 2011/0217619 | A1 | * | 9/2011 | Yoshie et al. | 429/482 |

FOREIGN PATENT DOCUMENTS

| KR |  | 2005/0098658 | 10/2005 |
| WO | WO | 2008/084713 | 7/2008 |
| WO | WO | 2009/063598 | 5/2009 |
| WO | WO | 2011/129967 | 10/2011 |

OTHER PUBLICATIONS

International Search Report for PCT/US2011/041037, 4 pages.

* cited by examiner

*Primary Examiner* — Jonathan Crepeau
(74) *Attorney, Agent, or Firm* — Gregory D. Allen

(57) ABSTRACT

A fuel cell electrode layer may include a catalyst, an electronic conductor, and an ionic conductor. Within the electrode layer are a plurality of electronic conductor rich networks and a plurality of ionic conductor rich networks that are interspersed with the electronic conductor rich networks. A volume ratio of the ionic conductor to the electronic conductor is greater in the ionic conductor rich networks than in the electronic conductor rich networks. During operation of a fuel cell that includes the electrode layer, conduction of electrons occurs predominantly within the electronic conductor rich networks and conduction of ions occurs predominantly within the ionic conductor rich networks.

12 Claims, 15 Drawing Sheets

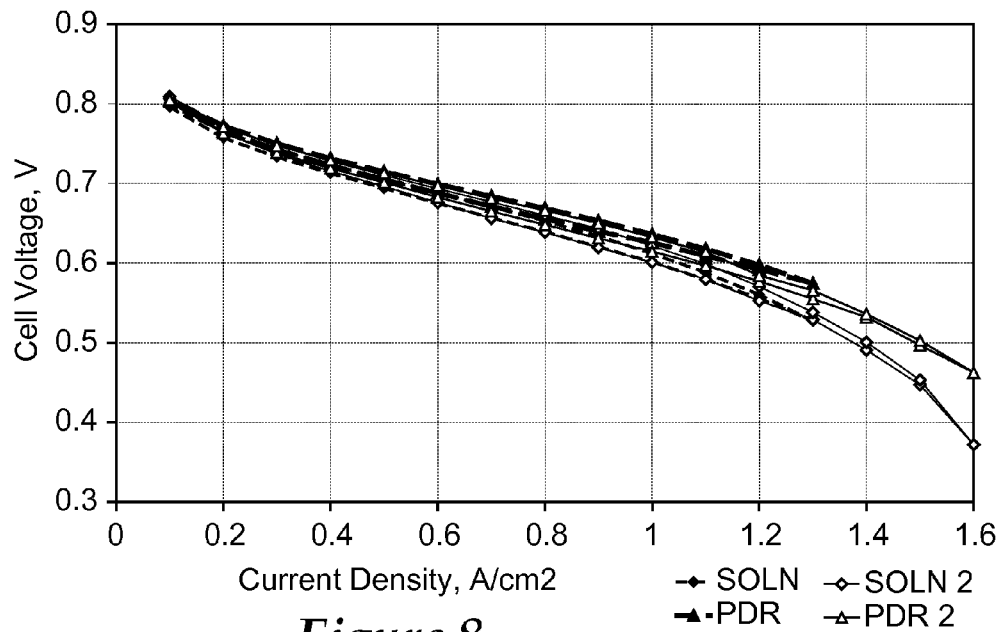
*Figure 8*
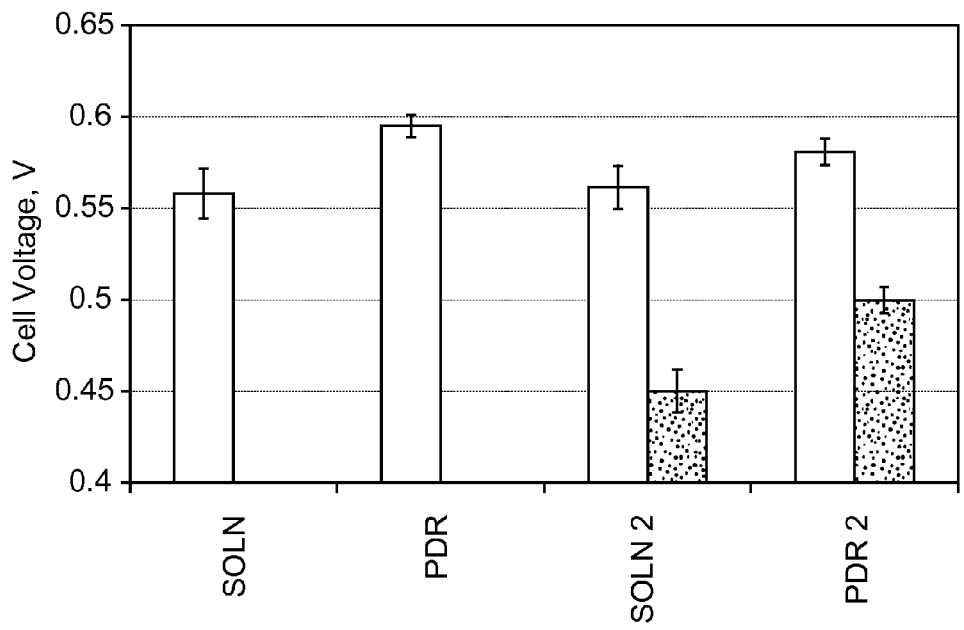
*Figure 9*   ☐ 70C, 100%RH, S=1.4/2.5, 1.2 A/cm2
            ☒ 70C, 100%RH, S=1.4/2.5, 1.5 A/cm2

FUEL CELL ELECTRODES WITH CONDUCTION NETWORKS

GOVERNMENT RIGHTS

This invention was made with Government support under Cooperative Agreement DE-FG36-07G017006 awarded by DOE. The Government has certain rights in this invention.

FIELD OF THE INVENTION

The present disclosure relates generally to fuel cells and/or fuel cell subassemblies and methods for fabrication of fuel cells and/or fuel cell subassemblies.

BACKGROUND

A fuel cell is an electrochemical device that combines hydrogen fuel and oxygen from the air to produce electricity, heat, and water. Fuel cells do not utilize combustion, and produce little if any hazardous effluents. Fuel cells convert fuel gases directly into electricity, and can be operated at much higher efficiencies than many other types of electric generators.

A typical polymer electrolyte membrane (PEM) fuel cell includes a membrane electrode assembly (MEA) comprising an ion conducting membrane (the PEM) with an anode electrode disposed on one side of the ion conducting membrane and a cathode electrode disposed on the other side of the ion conducting membrane. Hydrogen is reduced into hydrogen ions and electrons at the anode electrode. The electrons provide an electrical current to drive an external load and the hydrogen ions pass through the membrane. At the cathode electrode, oxygen combines with the hydrogen ions to form water as a byproduct. Fuel cell operation depends in part on the degree of transportation of gases, liquids, electrons, and ions through the materials that form the layers of the MEA.

SUMMARY

Embodiments described in the disclosure involve a fuel cell electrode layer that includes a catalyst, an electronic conductor, and an ionic conductor. Within the electrode layer are a plurality of electronic conductor rich networks and a plurality of ionic conductor rich networks that are interspersed with the electronic conductor rich networks. A volume ratio of the ionic conductor to the electronic conductor is greater in the ionic conductor rich networks than in the electronic conductor rich networks. During operation of a fuel cell that includes the electrode layer, conduction of electrons occurs predominantly within the electronic conductor rich networks and conduction of ions occurs predominantly within the ionic conductor rich networks.

In some implementations, the ionic conductor may include spray dried particles of an ion conducting polymer. The ionic conducting polymer may comprise perfluorinated sulfonic acid (PFSA), and/or perfluorinated imide acid (PFIA), and/or a hydrocarbon, for example. Many particles, and in some embodiments a majority of the particles, may be hollow spheroids which have outer surfaces that are substantially smooth. A majority of the particles may have diameters greater than 50 nm or diameters in a range of about 1 μm to about 15 μm, for example.

In some implementations, the electronic conductor can be catalyst coated electronic conductor particles, e.g., platinum coated on carbon. Alternatively, the catalyst may be disposed on support elements other than the electronic conductor, such as nanostructured support elements. The electronic conductor may include one or more of carbon, tin oxide, and titanium oxide. The catalyst may be one or more of platinum, palladium, bimetals, metallic alloys, and carbon nanotubes. The solvent may comprise water, alcohol, and/or other hydrocarbons, for example.

The ionic conductor may comprise particles of a first ion conducting polymer and the electrode layer may further include particles of a second ion conducting polymer. According to some aspects, the first ion conducting polymer has a first equivalent weight and the second ion conducting polymer has a second equivalent weight. A majority of the particles of the second ion conducting polymer may have diameters less than about 50 nm and a majority of the particles of the first ion conducting polymer may have diameters greater than about 50 nm or greater than about 1 μm or have an average diameter of about 3.5 μm. In some implementations, the particles of the second ion conducting polymer form a film on the electronic conductor and the particles of the first ion conducting polymer comprise a majority of the volume of the ionic conductor. The particles of the first ion conducting polymer having diameters greater than about 1 μm may substantially form the ion conducting networks.

The electrode layer may be disposed on a fuel cell electrolyte membrane or on a gas diffusion layer. The electrode layer can be disposed between a first surface of a fuel cell electrolyte membrane and a first gas diffusion layer that are components of a membrane electrode assembly (MEA). The MEA also includes a second electrode layer disposed between a second surface of the electrolyte membrane and a second gas diffusion layer. The second electrode layer may or may not include ionic and electronic networks. The fuel cell subassembly may further include first and second flow field plates positioned, respectively, proximate the first and second gas diffusion layers. Multiple MEAs may be arranged to form a fuel cell stack.

A method of making a fuel cell electrode layer includes combining an ionic conductor, an electronic conductor, a catalyst, and a solvent to form an electrode ink. The ionic conductor comprises smooth, spheroid particles, a majority of the particles having diameters greater than about 50 nm or greater than 1 μm, or in a range between about 50 nm to about 15 μm, for example. The ionic conductor, the electronic conductor, the catalyst, and the solvent of the electrode ink are mixed for a period of time. The electrode ink is coated on a substrate and dries to form the fuel cell electrode layer.

In some electrode inks, the electronic conductor is coated with the catalyst. Some electrode inks include catalyst which is disposed on support structures other than the electronic conductor. The support structures can be nanostructured supports, for example.

A fuel cell catalyst coated membrane (CCM) may be formed by coating the electrode ink on a fuel cell electrolyte membrane. The electrode ink may alternatively or additionally be coated on a fuel cell gas diffusion layer.

In some implementations, the particles of the ionic conductor comprise spray dried ionomer particles that can be hollow, substantially spherical (spheroid), and/or can have substantially smooth outer surfaces.

The method may involve substantially contemporaneously combining the ionic conductor, the electronic conductor, and the solvent prior to the mixing.

The method may involve forming a pre-mixture that includes the electronic conductor and the solvent and mixing the pre-mixture for a period of time. After mixing the premixture, the ionic conductor is added to the pre-mixture and the ionic conductor and pre-mixture are mixed for a period of time.

The method may involve adding a second type or second form of ionic conductor before and/or after mixing the ionic conductor, the electronic conductor, the catalyst, and the solvent.

In several variations, the electrode ink may include multiple types or forms of ionic conductors, including a first type of ion conducting polymer and a second type of ion conducting polymer. The electrode ink may include a first form and a second form of the same ionic conductor. The electrode ink may include a first ionic conductor having a first equivalent weight and a second ionic conductor having a second equivalent weight.

The ionic conductor can comprise particles of a first ion conducting polymer, a majority of the particles of the first ion conducting polymer having diameters greater than about 1 µm. A majority of the particles of the second ion conducting polymer have diameters less than about 50 nm.

In some implementations, a volume of the first ion conducting polymer is greater that a volume of the second ion conducting polymer.

During formation of the electrode layer, the particles of the second ion conducting polymer may coat particles of the electronic conductor.

The method further includes forming the ionic conductor by spray drying an ion conducting polymer. An additive such as cerium and/or manganese compounds may be added during the formation of the spray dried ionic conductor and/or at other times during the formation of the electrode ink.

Combining the components of the electrode layer may be accomplished by one or more of ball mixing, stirring, and sonication.

Some embodiments involve a fuel cell subassembly that includes an electrode layer, comprising a catalyst, an electronic conductor, and an ionic conductor intermixed with the electronic conductor and the catalyst. The ionic conductor includes particles, and a majority of the particles are spheroids having diameters greater than about 50 nm.

In some implementations, a majority of the particles of the ionic conductor have a substantially smooth outer surface and/or are hollow and/or have diameters in a range of about 1 µm to about 15 µm.

The electronic conductor may be a catalyst coated electronic conductor and/or the catalyst may be coated on supports other than the electronic conductor. The ionic conductor may be one or more of perfluorinated sulfonic acid and perfluorinated imide acid.

The fuel cell subassembly may further include a second ionic conductor of a form or type that is different from the ionic conductor. For example, the first ionic conductor may have a first equivalent weight and the second ionic conductor may have a second equivalent weight. As another example, the second ionic conductor may comprise particles, and a majority of the particles of the second ionic conductor may have diameters less than about 50 nm.

The particles of the ionic conductor may be distributed non-uniformly within the electrode layer and the particle of the second ionic conductor may coat the electronic conductor.

The electrode layer can be disposed on a fuel cell electrolyte membrane and/or on a fuel cell gas diffusion layer. The electrode layer may be incorporated into a fuel cell membrane electrode assembly and/or into a fuel cell stack.

A fuel cell subassembly includes an electrode layer that includes a catalyst, an electronic conductor, a first ionic conductor and a second ionic conductor that is different from the first ionic conductor. The first ionic conductor and the second ionic conductor are intermixed with each other, the electronic conductor, and the catalyst within the electrode layer.

The first and second ionic conductors may be different types of ionic conductor or may be different forms of the same type of ionomer. Particles of the first ionic conductor may be larger than particles of the second ionic conductor. Particles of the smaller particled ionic conductor may form a film on the electronic conductor. For example, a majority of particles of the second ionic conductor may have diameters less than about 50 nm. Particles of the first ionic conductor may be powdered spray dried particles or powdered cryoground particles. Particles of at least one of the ionic conductors, e.g., particles of the first ionic conductor, may be non-uniformly distributed within the electrode layer.

The above summary is not intended to describe each embodiment or every implementation. A more complete understanding of various embodiments will become apparent and appreciated by referring to the following detailed description and claims taken in conjunction with the accompanying drawings.

BRIEF DESCRIPTION OF THE DRAWINGS

FIG. 8 shows comparative polarization performance results for MEAs with solution-based ionomer electrodes and powder-based ionomer electrodes;

FIG. 9 compares MEA performance of solution-based ionomer electrodes and powder-based ionomer electrodes at current densities of 1.2 A/cm$^2$ and 1.5 A/cm$^2$;

Figure 1:
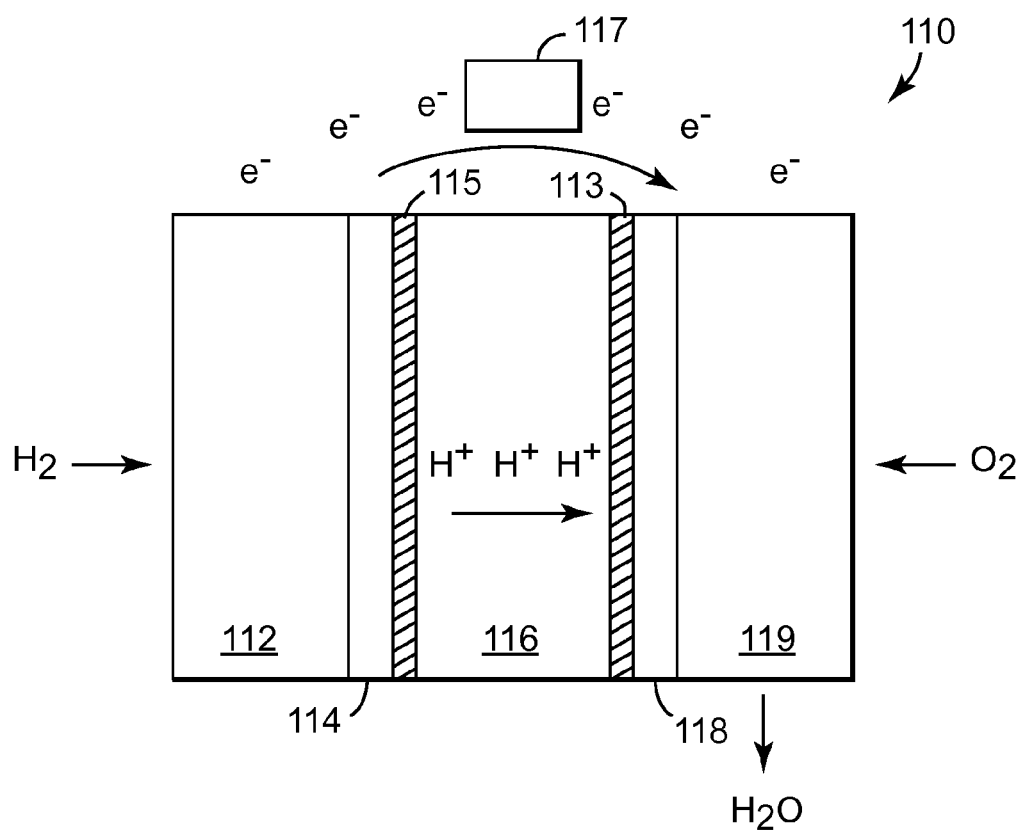
FIG. 1 depicts a typical fuel cell and the fuel cell's basic operation.

Embodiments of the invention are amenable to various modifications and alternative forms and are shown and described by way of example in the drawings and the specification. It is to be understood, however, that the intention is not to limit the invention to the particular embodiments described. On the contrary, the intention is to cover all modifications, equivalents, and alternatives falling within the scope of the invention as defined by the appended claims.

DESCRIPTION OF VARIOUS EMBODIMENTS

Some of the basic components of a polymer electrolyte membrane (PEM) fuel cell 110 (without subgaskets, gaskets, or seals) are depicted in FIG. 1. In operation, hydrogen fuel, $H_2$, is introduced into the anode side of the fuel cell 110, passing over the first flow field plate 112 and through the gas diffusion layer (GDL) 114. Oxygen, $O_2$, from the air flows through the second flow field plate 119 and through the second GDL 118 at the cathode side of the fuel cell 110. The GDLs 114, 118 promote air and hydrogen diffusion to the anode and cathode electrodes 115, 113, and aid in drawing end product water vapor and liquid away from the electrodes 115, 113. A microporous layer (not shown) may be disposed between the GDLs 114, 118 and the electrodes 115, 113. The flow field plates 112, 119 typically include a pattern of flow channels designed to distribute reactant gases across the active area of the fuel cell.

At the anode electrode layer 115, the hydrogen fuel is separated into hydrogen ions ($H^+$) and electrons ($e^-$). The electrolyte membrane 116 permits the hydrogen ions or protons and water to pass through the electrolyte membrane 116 to the cathode electrode layer 113 of the fuel cell 110. The electrons flow through an external electrical circuit 117 in the form of electric current. At the cathode electrode layer 113, oxygen, hydrogen ions, and electrons combine to produce water ($H_2O$) and heat. The electrical current produced by the fuel cell 110 can power an electric load 117, such as an electric motor, and/or can be directed to an energy storage device, such as a rechargeable battery. Five layers of the fuel cell, the membrane 116, electrodes 113, 115, and GDLs 114, 118, are often referred to as a membrane electrode assembly (MEA).

Individual fuel cells, such as the fuel cell 110 shown in FIG. 1, can be combined with a number of other fuel cells to form a fuel cell stack. The number of fuel cells within the stack determines the total voltage of the stack, and the surface area of each of the cells determines the total current. The total electrical power generated by a given fuel cell stack can be determined by multiplying the total stack voltage by total current.

The term "electrode" is used herein to refer to the layers within the fuel cell MEA containing catalyst. The basic components that make the fuel cell electrodes include a catalyst, an electronic conductor, which may also support the catalyst, and an ionic conductor. In some implementations, the electronic conductor comprises carbon which may or may not be coated with a catalyst such as platinum, platinum alloy, or another material. The ionic conductor may comprise an ion conducting polymer. The ionic conductor facilitates conduction of ions through the electrode layer. The electronic conductor facilitates conduction of electrons through the electrode layer. Electrodes generally contain a certain amount of void space (pores) for gas and/or liquid diffusion into and out of the electrode layer.

Some embodiments described herein involve fuel cell electrodes that include multiple ionic conductors, wherein the ionic conductors have different characteristics. For example, each of the ionic conductors may comprise an ionomer and at least one of the ionomers used in the electrode layer may have one or more characteristics that differ from the characteristics of other ionomers in the electrode layer. As a further example, the electrode layer may include two or more ionomers differing in type and/or equivalent weights (EWs) and/or form. As used herein, "type" refers to characteristics of chemical structure and "form" refers to characteristics of physical shape and size, e.g., different particle sizes or shapes.

The electrode layer has two major surfaces, a width, length, and thickness. In some implementations, the two or more ionomers in the electrode layer may be distributed substantially uniformly between the two major surfaces throughout the thickness and/or length and/or width of the electrode layer. In some implementations, the first ionomer may have a first distribution with in the electrode layer and the second ionomer may have a second distribution within the electrode layer. For example, one of the ionomers may be substantially uniformly distributed through the electrode layer and another of the ionomers may be non-uniformly distributed through the electrode layer.

In some embodiments, only one or at least one ionic conductor is used in the electrode layer, and the distribution of the ionic conductor is non-uniform within the electrode layer. The non-uniform distribution of the ionic conductor may provide networks rich in the ionic conductor within the electrode layer that enhance ionic conduction through the ionic conductor rich networks. Complementary networks that are relatively poor in the ionic conductor are also present in the electrode layer and these complementary networks may be rich in the electronic conductor of the electrode layer. Thus, both ionic conductor rich networks that enhance conduction of ions and electronic conductor rich networks that enhance conduction of electrons may simultaneously exist when at least one ionic conductor is non-uniformly distributed in the electrode layer.

Embodiments described herein involve methods for the formation of fuel cell electrodes which include networks that enhance ionic conduction and/or electronic conduction through the electrode layer. The ionic and/or electronic conduction networks may traverse or partially traverse the thickness of the electrode layer. Fuel cell electrodes having ionic and electronic conduction networks may been formed in a fabrication process that uses an ionomer powder having particles with certain morphological characteristics.

Fuel cell electrodes may be made from an "ink" formed by mixing catalyst, electronic conductor, and an ionic conductor in solvent. According to some implementations, the ionic conductor used includes small particles of an ion conducting polymer (denoted ionomer) suspended and/or dissolved in solution, e.g., ionomer particles less than about 50 nm in diameter. An ionic conductor with particles less than about 50 nm which are suspended and/or dissolved in solution is referred to herein as "solution-based" ionic conductor. Ionomer particles in this size range may be formed by heating a solution of ionomer and water (or other solvent) in a sealed enclosure to achieve high pressure at which point the ionomer dissolves into particles having diameters under about 50 nm. These small particles of ionomer may be mixed with a solvent, a catalyst, and an electronic conductor to form the electrode ink. The electrode ink is applied to a substrate and dried to form an electrode layer as illustrated in FIG. 2A.

Figure 2A:
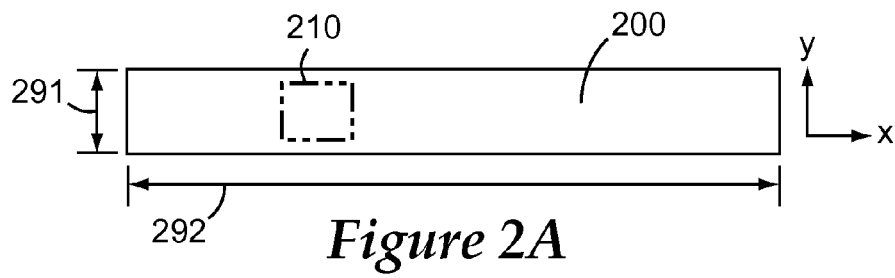
FIG. 2A is a cross section diagram of a fuel cell electrode in which the ionic conductor material and the electronic conductor material is distributed substantially uniformly.
Figure 2B:
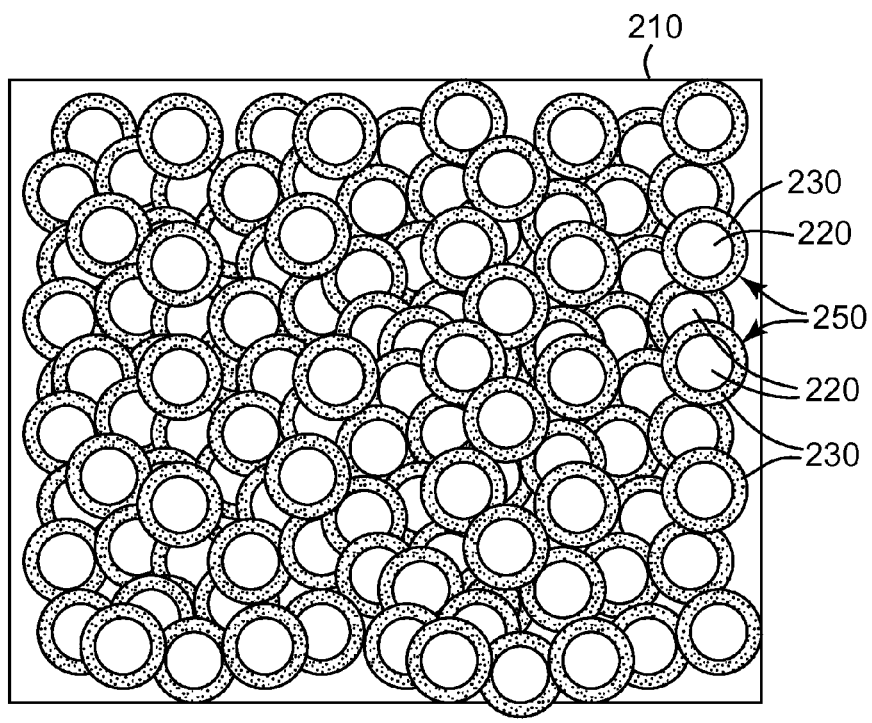
FIG. 2B is a close up representation of a region of the fuel cell electrode of FIG. 2A.

FIG. 2A is a diagram of a cross section of a typical electrode layer 200 that is formed using a solution-based ionomer according to the process outlined in the preceding paragraph. The electrode layer 200 is thin, having a thickness 291 which is small compared to the width 292 of the electrode layer 200. FIG. 2B is a close up representation of a region 210 (e.g., approximately a 2 micron×2 micron sized region) of the electrode layer 200. The electrode structure illustrated in the close up representation of the electrode layer region 210 results from mixing an ionic conductor having small (<50 nm) particles in a solvent with a catalyst and an electronic conductor. The particles of the electronic conductor 220 (or catalyst coated electronic conductor) may have diameters of about 100 nm, for example. The catalyst may be coated on the electronic conductor 220 or may otherwise be distributed within the electrode layer, e.g., coated on catalyst support structures. FIG. 2B illustrates a cross section of the electronic conductor particles 220 surrounded by the ionic conductor particles 230 forming ionic/electronic conductor structures 250. In this embodiment, the particles of the ionic conductor 230 and electronic conductor 220 are distributed substantially uniformly within the electrode layer 200.

Figure 2C:
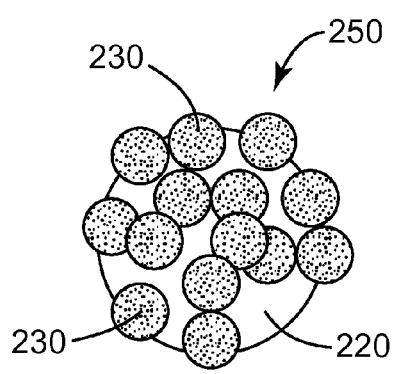
FIG. 2C is a depiction of an ionic/electronic conductor structure having an electronic conductor which is surrounded by numerous small particles of the ionic conductor.
Figure 2D:
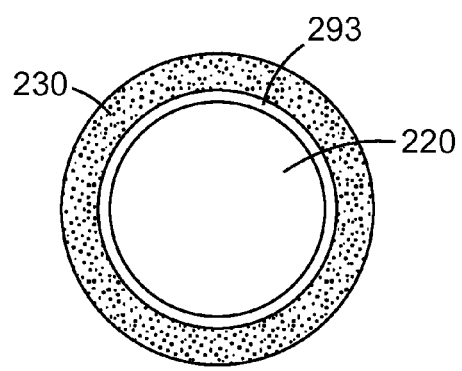
FIG. 2D illustrates a cross section of an ionic/electronic conductor structure, in which the ionic conductor forms a film surrounding a catalyst coated electronic conductor.

Structure 250 in FIG. 2B may exist (as shown in FIG. 2C) as a small particles 230 dispersed on the surface of the electronic conductor (220) or as a coating (as shown in FIG. 2D) of ionomer 230 on the surface of electronic conductor 220. In all cases, the electronic conductor 220 may or may not contain catalyst particles dispersed over its surface. FIGS. 2B, 2C and 2D may be created using solution-based ionomer.

FIG. 2C is a depiction of an ionic/electronic conductor structure 250 having an electronic conductor 220 which is substantially surrounded by numerous small particles of the ionic conductor 230. In some embodiments, the electronic conductor 220 may be coated with a catalyst.

FIG. 2D illustrates a cross section of an ionic/electronic conductor structure 250, in which the ionic conductor particles 230 are so small in comparison to the electronic conductor 220 that the ionic conductor particles form a film surrounding the electronic conductor 220. In this example, the electronic conductor 220 is coated with the catalyst 293. In some embodiments, the catalyst 293 may be disposed on support structures rather than the electronic conductor 220 and the catalyst coated support structures may be dispersed within the electrode layer 200.

An electrode ink comprising an electronic conductor and a solution-based ionic conductor forms electrode layers having substantially uniform distribution of ionic and electronic conductor materials through the electrode layer as illustrated in FIG. 2B. Electrodes exhibiting substantially uniform distribution of ionic and electronic conductor materials may not perform optimally during fuel cell operation due to the incompatibility of various competing transport and conduction functions of the fuel cell electrode.

Some embodiments involve fuel cell electrodes that include non-uniform distribution of only one or at least one ionic conductor and/or include multiple ionic conductors which are uniformly or non-uniformly distributed. In the embodiments using multiple ionic conductors, each ionic conductor is different in some characteristic from other ionic conductors in the electrode. These non-uniform and/or multiple ionic conductor implementations can provide enhanced durability and/or performance when compared fuel cell electrodes having a single, uniformly distributed solution based ionic conductor. In implementations that use multiple ionic conductors, the multiple ionic conductors may comprise different types of ionomers or may comprise the same type of ionomer having different forms. The fuel cell electrodes may also include multiple electronic conductors and/or multiple catalysts, where each electronic conductor or catalyst is different in some characteristic than the other electronic conductors or catalysts, such as, e.g., equivalent weight.

Figure 2E:
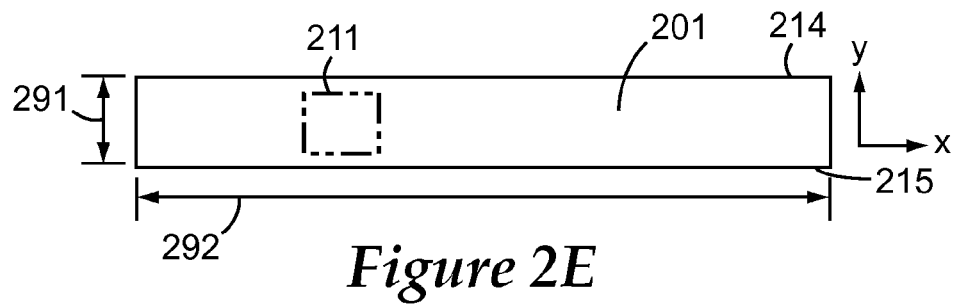
FIG. 2E is a cross section diagram of a fuel cell electrode that comprises two ionic conductors.
Figure 2F:
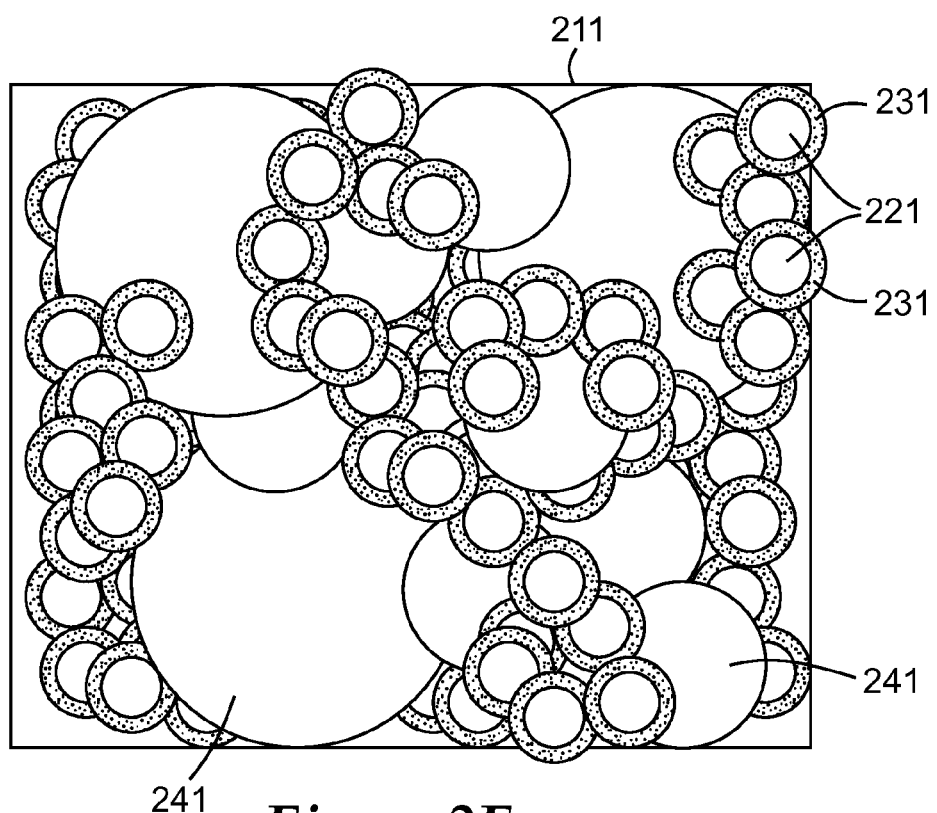
FIG. 2F is a close up representation of a region of the fuel cell electrode of FIG. 2E.

FIGS. 2E and 2F provide an example of a multiple ionic conductor embodiment. FIG. 2E illustrates a cross section of a fuel cell electrode layer 201 having a first major surface 214 and a second major surface 215. The electrode layer 201 includes two ionic conductors 231, 241, e.g., two ionomers. In this example, a majority of the particles of the first ionomer 241 have diameters greater than about 1 μm. Ionic conductors that include particles, a majority of which have diameters greater than solution based particles (e.g. greater than 50 nm or greater than about 1 μm) are referred to herein as powdered ionic conductors. The second ionomer 231 is a solution based ionomer, wherein a majority of the particles of the second ionomer 231 have diameters less than about 50 nm. In this embodiment, particles of the second ionomer 231 and the first ionomer 241 are intermixed with each other and with the electronic conductor 221 throughout the electrode layer 201 between the first major surface 214 and the second major surface 215.

FIG. 2F provides a close up representation of a region 211 of the electrode layer (e.g., approximately a 2 micron×2 micron sized region) that depicts each of the first and second ionomers 241, 231, along with the electronic conductor 221. In this implementation, particles of the second ionic conductor 231 coat the electronic conductor 221, as shown in cross section in FIG. 2F. Note that the electrode layer 201 also includes a catalyst (not shown) which may be coated on the electronic conductor 221 and/or otherwise distributed throughout the electrode layer 201, e.g., on catalyst support structures.

The larger diameter particles of the first ionomer 241 may be formed, for example, by cryogrinding, spray drying or other techniques. Although the ionic and/or electronic conductor particles 221, 231, 241 are represented by spheres having smooth outer surfaces, the particles 221, 231, 241 may have morphologies other than spheroid. For example, ionomer particles formed by cryogrinding are not necessarily spheroid and may have rough surfaces (see, e.g., FIGS. 7A and 7B). Ionomer particles formed by spray drying are spheroid with substantially smooth outer surfaces (see, e.g., FIG. 6). For example, substantially spherical (spheroid) particles with substantially smooth outer surfaces may have variations in diameter less than about 10% and surface roughness less than about 5% of the diameter.

The use of two or more different ionomers may be beneficial to meet the conflicting requirements of a fuel cell electrode. For example, the second ionomer may provide superior catalyst support corrosion resistance and/or catalyst dissolution resistance characteristics to the electrode layer when compared to the first ionomer, but provide reduced performance when compared to the first ionomer. The use of these two types of ionomer mixed uniformly or non-uniformly within the electrode layer may enhance both durability and performance. For example, the first ionomer may have a lower EW than the second ionomer. The first ionomer (lower EW ionomer) provides superior performance when the fuel cell is operating under hot/dry conditions. The second (higher EW ionomer) provides superior performance when the fuel cell is operating under cold/wet conditions. The small particles of the second ionomer may coat the electronic conductor to provide corrosion resistance and enhanced durability.

In some configurations, the ionomer particles may form agglomerations of ionomer particles which are distributed throughout the electrode layer. Without wishing to be bound by any particular theory, the affinity of the ionomer particles to form agglomerations may be related to the morphology of the ionomer particles. For example, it is believed that the approximately micron sized, substantially smooth, hollow, spheroid powdered ionomer particles formed by spray drying are more likely to associate in agglomerations.

Figure 2G:
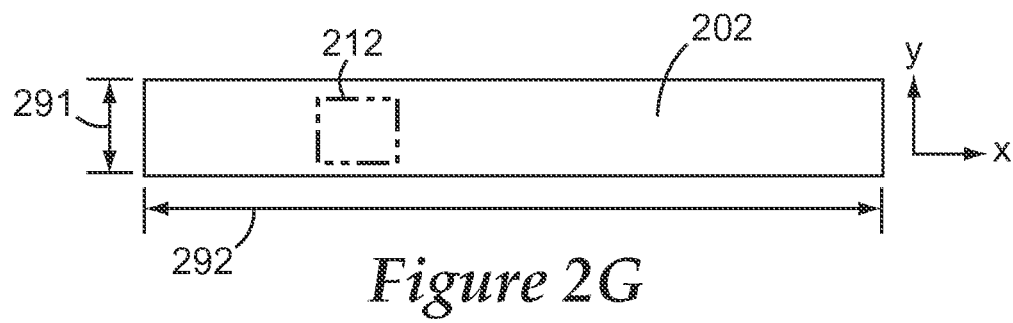
FIG. 2G illustrates a cross section of electrode layer that includes micron sized powdered ionic conductor particles.
Figure 2H:
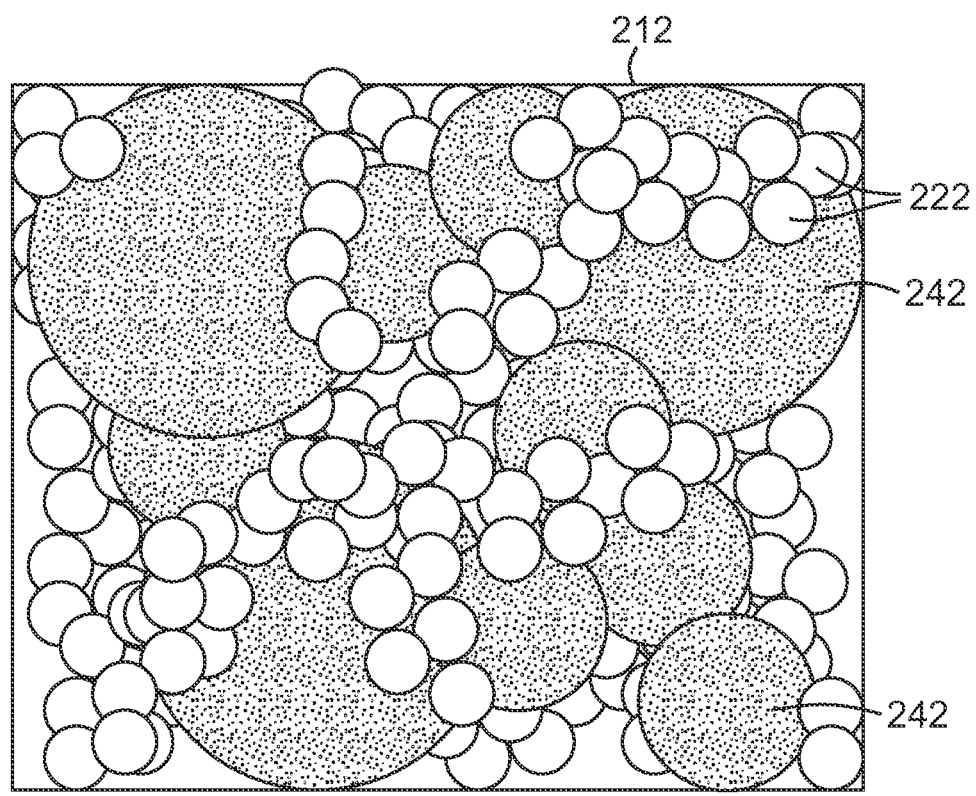
FIG. 2H is a close up representation of a region of the fuel cell electrode of FIG. 2G.

FIG. 2G illustrates a cross section of electrode layer 202 that includes micron sized powdered ionomer particles and does not include the smaller (<50 nm) solution-based ionomer particles. FIG. 2H provides a close up representation of a region 212 of the electrode layer 202 (e.g., approximately a 2 micron×2 micron sized region) that depicts micron sized powdered ionomer particles 242. Catalyst may be coated on the electronic conductor particles 222 or may be otherwise distributed within the electrode layer 202.

Figure 2I:
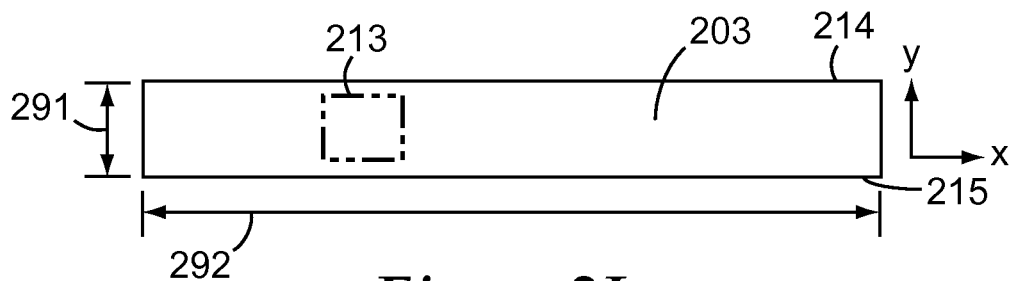
FIG. 2I illustrates a cross section of electrode layer that includes multiple powdered ionic conductors.

In some embodiments, the electrode layer comprises multiple types or forms of powdered ionic conductor particles and each type or form of the ionic conductor particles can be uniformly or non-uniformly distributed within the electrode layer. FIG. 2I illustrates a cross section of electrode layer 203 having a first major surface 214 and a second major surface 215. The electrode layer 203 includes particles of multiple powdered ionic conductors 233, 243. In this embodiment, particles of the first ionic conductor 233 and particles of the second ionic conductor 243 are intermixed with each other and with the electronic conductor 223 throughout the electrode layer 203 between the first major surface 214 and the second major surface 215. The electrode layer 203 may or may not include the smaller (<about 50 nm) solution-based ionomer particles.

Figure 2J:
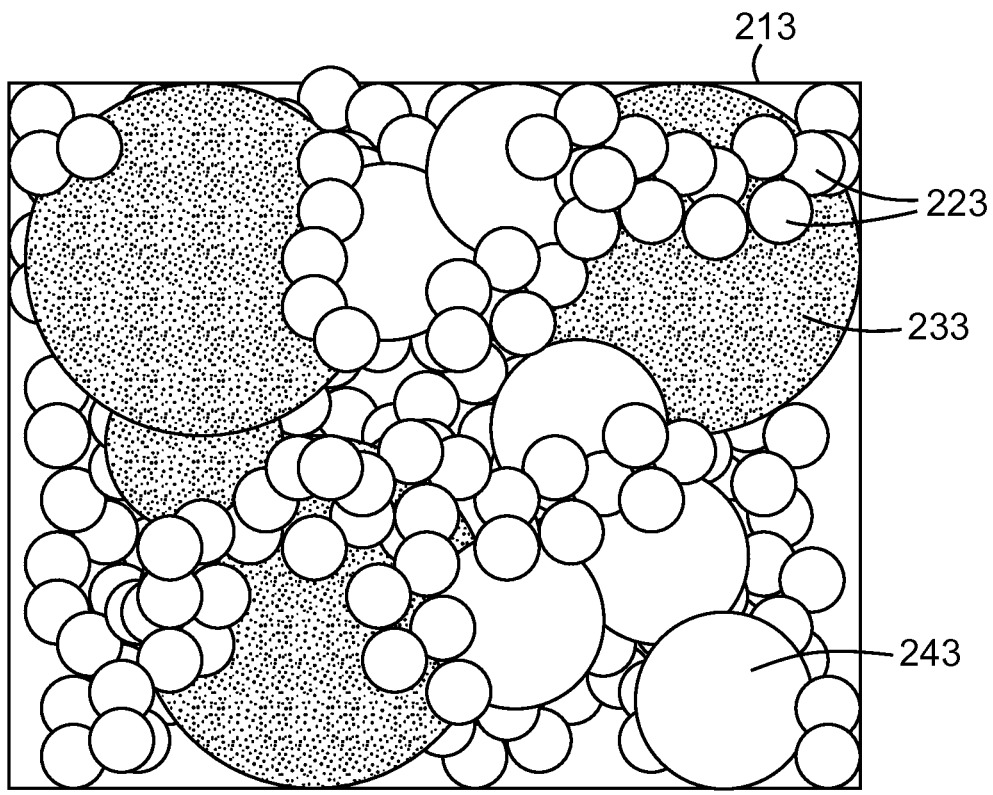
FIG. 2J is a close up representation of a region of the fuel cell electrode of FIG. 2I.

FIG. 2J provides a close up representation of a region 213 of the electrode layer 203 (e.g., approximately a 2 micron×2 micron sized region) that includes first powdered ionomer particles 233 and second powdered ionomer particles 243. For example, the multiple powdered ionic conductors 233, 243 may comprise different types of powdered ionomers. As another example, the multiple powdered ionic conductors may comprise the same type of powdered ionomer, but may be different forms of the same type of powdered ionomer, e.g., one form could be spray dried ionomer and the other form could be cryoground ionomer. Catalyst may be coated on the electronic conductor particles 223 and/or may be otherwise distributed within the electrode layer 203.

Figure 3A:
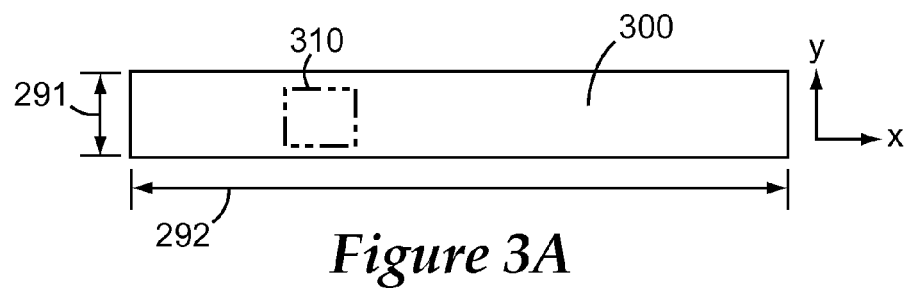
FIG. 3A is a cross section diagram of a fuel cell electrode that includes ionic and electronic conductor rich networks.
Figure 3B:
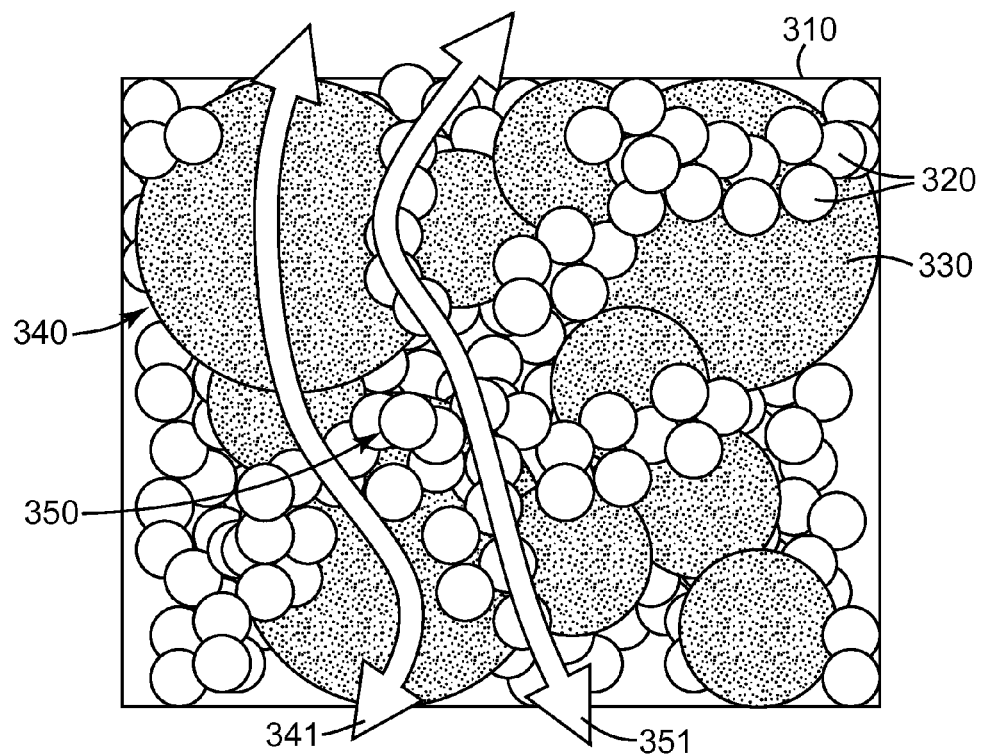
FIG. 3B is a close up representation of a region of the fuel cell electrode of FIG. 3A.

Some embodiments involve fuel cell electrodes that include regional ionic and/or electronic conductor-rich networks that at least partially traverse the thickness of the electrode layer. The ionic conductor and electronic conductor materials in these electrodes are non-uniformly distributed so that regions within the electrode layer have relatively more ionic conductor material, e.g., as measured by weight or volume, than electronic conductor material and/or regions within the electrode layer have relatively more electronic conductor material, e.g., as measured by weight or volume, than ionic conductor material. FIG. 3A is a diagram of a cross section of an electrode layer 300 comprising powdered ionic conductor particles that form ionic conductor rich networks. The electrode layer 300 has a thickness 291 which is small compared to the width 292 of the electrode layer. FIG. 3B provides a close up representation of a region 310 of the electrode layer 300 (e.g., approximately a 2 micron×2 micron sized region). The electrode structure illustrated in FIGS. 3A and 3B can be formed from an electrode ink which is a mixture of a powdered ionic conductor with powder particles greater than about 1 μm, a catalyst, an electronic conductor, and a solvent.

FIG. 3B illustrates the ionic conductor material 330 and the electronic conductor material 320 distributed in a plurality of ionic conductor rich networks 340 and a plurality of electronic conductor rich networks 350. The ionic conductor rich networks 340 (also referred to herein as "ionic conductor networks") have a volume ratio of ionic conductor to electronic conductor that is greater than the volume ratio of ionic conductor to electronic conductor within the electronic conductor rich networks 350 (also referred to herein as "electronic conductor networks." The electronic conductor networks 350 have a volume ratio of electronic conductor to ionic conductor that is greater than the volume ratio of electronic conductor to ionic conductor within the ionic conductor networks 340. The electronic conductor networks 350 are substantially discrete and separate from the ionic conductor networks 340. The affinity for some types of ionomer particles (micron sized particles that are smooth, spheroid and/or hollow) to form particle agglomerations may contribute to the formation of the ionic conductor networks 340 and/or the electronic conductor networks 350. The ionic conductor networks 340 provide lower resistance paths 341 for ion conduction when compared with the electronic conductor networks 350. The electronic conductor networks 350 provide lower resistance paths 351 for electron conduction when compared with the ionic conductor networks 340. When ionic conduction and electronic conduction networks are present in the electrode layer, conduction of electrons can occur predominantly within the electronic conductor rich networks and conduction of ions can occur predominantly within the ionic conductor rich networks when the fuel cell is in operation.

Fuel cell electrodes with ionic and electronic conductor networks, as shown in FIGS. 3A and 3B, may exhibit superior performance when compared to the electrode layers which have ionic and/or electronic conductor materials that are substantially uniformly distributed through the electrode layer. For example, the superior performance characteristics of the networked electrodes may include superior material transport and/or superior electrical conduction properties. The electrodes having ionic and/or electronic conductor networks may also exhibit superior durability properties when subjected to the ranges of temperature, electrical potential, and relative humidity encountered during fuel cell operation.

Without wishing to be bound by any particular theory, the formation of the substantially discrete ionic and/or electronic conductor networks could be related to the phase of the ionic conductor material when it is mixed with the electronic conductor material during fabrication of the electrode layer. For example, mixing the ionic conductor which comprises small size particles (<about 50 nm particles suspended or dissolved solution) with the electronic conductor appears to create an electrode layer that exhibits a more uniform distribution of the ionic and electronic conductors as in the electrode layer illustrated in FIGS. 2A and 2B. In contrast, mixing certain types or forms of ionic conductor with the electronic conductor material produces an electrode layer exhibiting ionic and electronic conductor networks as illustrated in FIGS. 3A and 3B. Again, without wishing to be bound by any particular theory, ionomer particles that are micron sized spheroid, relatively smooth, and/or hollow appear to more readily form the networks that provide enhanced ionic and electronic conduction pathways.

In some implementations, multiple types of ionomer may be used to form the electrode layer, with at least a first type of ionomer contributing to ionic conductor networks in the electrode layer. The second ionomer may or may not contribute to the ionic conductor networks. The second ionomer may be distributed substantially uniformly or non-uniformly in the electrode layer.

Figure 3C:
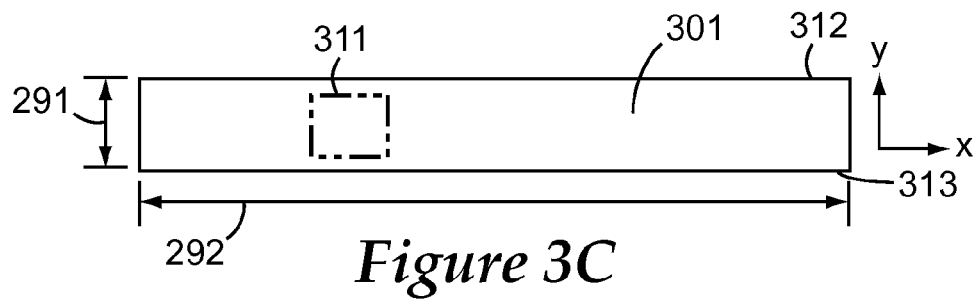
FIG. 3C is a cross section diagram of a fuel cell electrode that includes two ionic conductors, at least one of the ionic conductors forming ionic conductor rich networks.
Figure 3D:
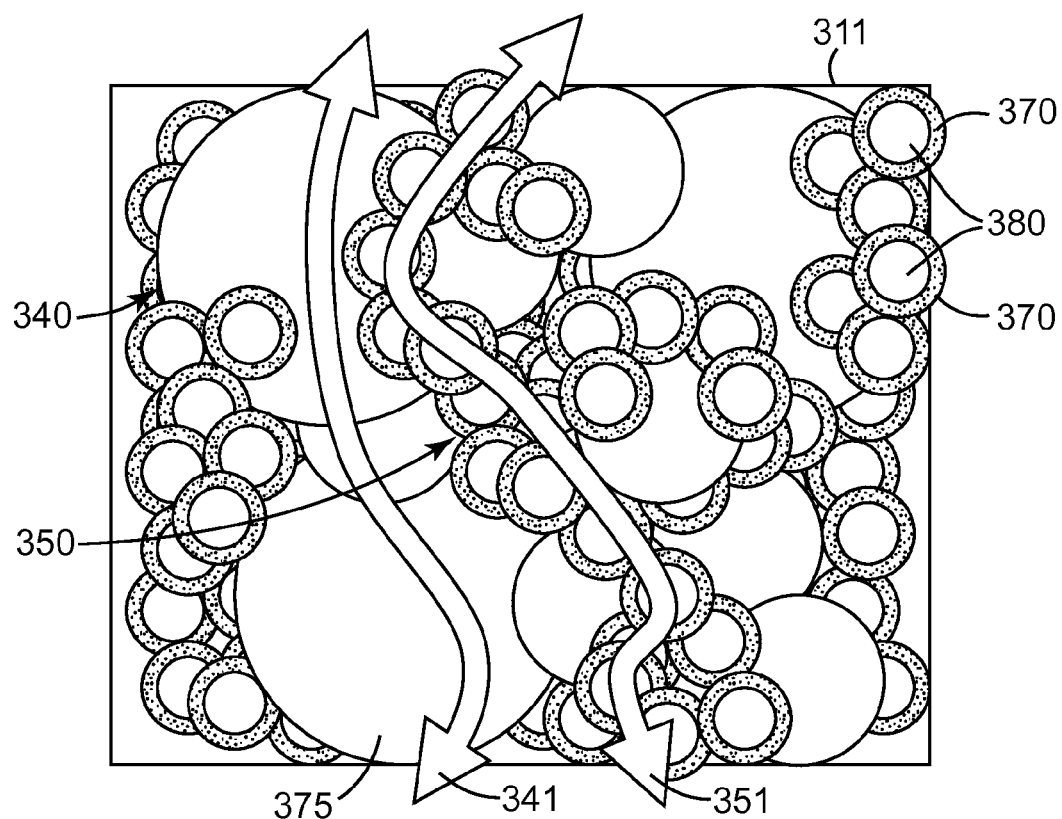
FIG. 3D is a close up representation of a region of the fuel cell electrode of FIG. 2C.

FIG. 3C is a cross section illustrating an electrode layer 301 comprising an electronic conductor 380, e.g., catalyst coated carbon, and first and second ionomers 375, 370. The electrode layer 301 includes a first major surface 312 and a second major surface 313. FIG. 3D provides a close up representation of a portion 311 of the electrode layer 301 (e.g., approximately a 2 micron×2 micron sized region). The electrode structure illustrated in FIG. 3D can be formed from an electrode ink which is a mixture of a first ionic conductor 375 comprising powdered particles greater than about 1 μm, a second ionic conductor 370 comprising particles less than about 50 nm, a catalyst, an electronic conductor 380, and a solvent. In this embodiment, particles of the first ionic conductor 375 and particles of the second ionic conductor 370 are intermixed with each other and with the electronic conductor 380 throughout the electrode layer 301 between the first major surface 312 and the second major surface 313. In some implementations, the amount of the first ionic conductor 375 in the electrode layer is greater than the amount of the second ion conductor 370 by volume. For example, the first ionic conductor 375 may comprise a spray dried and/or cryoground powdered ionomer and the second ionic conductor 370 may comprise the solution based ionomer as previously discussed.

The close up representation 311 illustrates the first ionic conductor material 375 and the electronic conductor material 380 distributed in a plurality of ionic conductor rich networks 340 and a plurality of electronic conductor rich networks 350. The second ionic conductor material 370 may surround and/or coat the electronic conductor particles 380 as depicted in FIG. 3D and/or may be distributed relatively uniformly through the electrode layer. The first ionic conductor 375 may comprise larger particles than the second ionic conductor, and may form ionic conductor networks 340 which facilitate transport of ions and water through the electrode layer 301. Formation of the ionic conductor networks 340 may be promoted because the powdered ionomer 375 has an affinity for agglomeration when the electrode layer is being formed, and these agglomerations form at least portions of the ionic conductor networks 340.

The ionic conductor networks 340 have a volume ratio of ionic conductor to electronic conductor that is greater than the volume ratio of ionic conductor to electronic conductor within the electronic conductor rich networks 350. The electronic conductor networks 350 have a volume ratio of electronic conductor to ionic conductor that is greater than the volume ratio of electronic conductor to ionic conductor within the ionic conductor networks 340. The ionic conductor networks 340 provide lower resistance paths 341 for ion conduction when compared with the electronic conductor networks 350. The electronic conductor networks 350 provide lower resistance paths 351 for electron conduction when compared with the ionic conductor networks 340.

The electrode layer structure illustrated in FIG. 3D may provide enhanced durability and/or performance. For example, the second ionomer 370 may provide superior catalyst support corrosion resistance and/or catalyst dissolution resistance characteristics to the electrode layer 301 when compared to the first ionomer 375, and the first ionomer 375 may provide enhanced performance characteristics to the electrode layer 301 when compared to the second ionomer 370. In some implementations, the second ionomer 370 may have a higher EW than the first ionomer. The second ionomer (higher EW ionomer) may provide superior characteristics than the first ionomer 375 when the fuel cell is operating under hot/dry conditions. The first ionomer 375 (lower EW ionomer) may provide superior characteristics than the second ionomer 370 when the fuel cell is operating under cold/wet conditions.

Processes for forming electrode layers involve forming an ink comprising a catalyst, an electronic conductor, an ionic conductor, and a solvent. More than one type and/or form of catalyst, electronic conductor, ionic conductor, and/or solvent may be used. For example, the ionic conductor may comprise perfluorinated sulfonic acid (PFSA), and/or perfluorinated imide acid (PFIA), and/or a hydrocarbon. PFIA is described in commonly owned U.S. Patent Application No. 61/325,062, filed Apr. 16, 2010, Hamrock et al. which is incorporated herein by reference. The solvent may comprise water, an alcohol, and/or a hydrocarbon, for example. The catalyst may comprise platinum, palladium, bimetals, metallic alloys, and/or carbon nanotubes. The catalyst may be coated on the electronic conductor, e.g., the electronic conductor and catalyst may comprise platinum coated carbon. In some embodiments, the catalyst may be coated on support elements other than the electronic conductor, such as the nanostructured supports described in U.S. Pat. No. 5,879,827. The electronic conductor may have particles with diameters of about 100 nm, for example, and may comprise carbon, tin oxide, and/or titanium oxide, and/or other suitable materials.

Specific amounts of each component of the electrode ink may be varied to achieve a desired viscosity, e.g., about 1000 centipoise, and solids content, e.g., about 2% to about 40% solids by weight. The electrode ink may be prepared by adding the ink components and then mixing the ink components for a period of time. In some implementations, the mixing may include adding media, such as 6 mm diameter ceramic beads and then rolling or ball milling for at least about 5 minutes. The prepared ink is then applied to a substrate, such as a major surface of a fuel cell electrolyte membrane, a GDL, or a liner, and dried. The dried ink layer forms the fuel cell electrode.

Figure 4A:
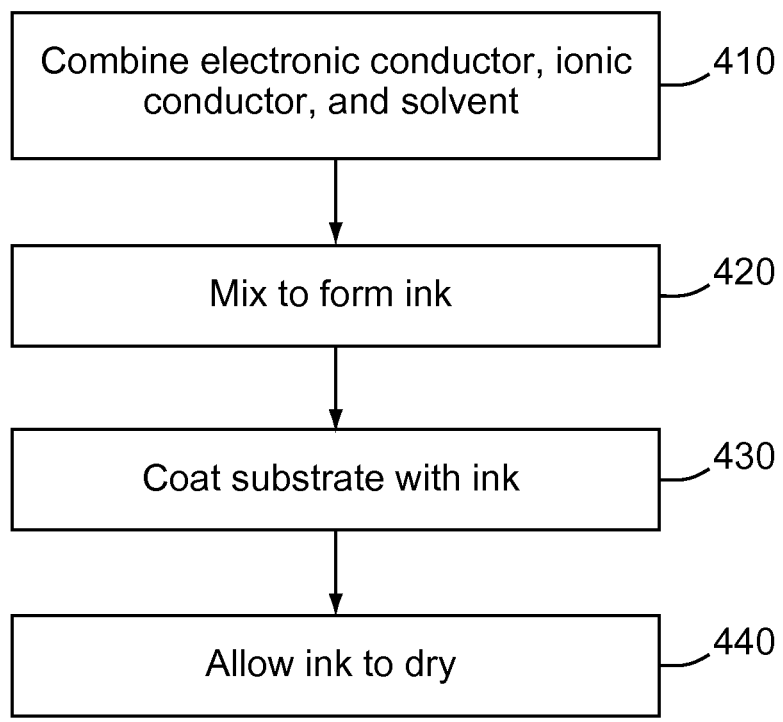
FIG. 4A is a flow diagram of a fuel cell electrode fabrication process that includes combining and mixing an ionic conductor and electronic conductor.
Figure 4B:
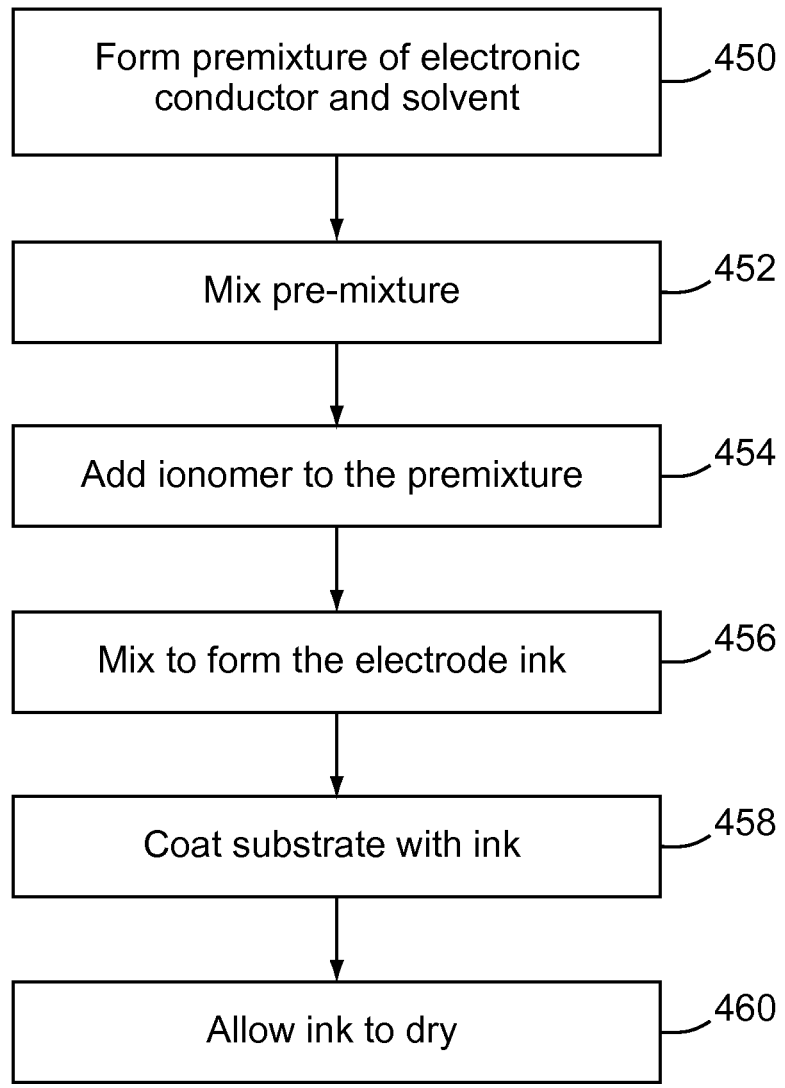
FIG. 4B is a flow diagram of a fuel cell electrode fabrication process that includes pre-mixing the electronic conductor with a solvent prior to combining the pre-mixture with an ionic conductor.

FIGS. 4A and 4B illustrate exemplary processes for forming a fuel cell electrode. As depicted in the flow diagram of FIG. 4A, an electrode ink may be formed by combining 410 the electronic conductor, catalyst, ionic conductor, and solvent and mixing 420 these ingredients for a period of time. For example, the electronic conductor, catalyst, ionic conductor, and solvent may be combined, e.g., combined substantially contemporaneously, and then mixed. After mixing, the ink is coated 430 on a substrate and allowed to dry 440 to form the fuel cell electrode layer. The ionic conductor of the electrode ink may comprise only one type of ionic conductor, e.g., an ionomer in the form of particles, a majority of which have diameters greater than about 50 nm or greater than about 1 µm. These ionomer particles may have substantially smooth, spheroid, and/or hollow morphology which can be produced by a spray drying process. As previously discussed, ionomer particles of this size and morphology may more readily form electrode layer structures that include ionic conductor networks.

Multiple types of ionomer and/or multiple forms of the same ionomer may be included in the ionic conductor forming the electrode ink. When multiple forms of the same ionomer are used, the multiple forms may be multiple different particle sizes and/or the multiple types may be multiple different EWs of what is otherwise the same type of ionomer. For example, a first ionomer of the multiple ionomers may be powdered, with a majority of particles having diameters greater than about 1 µm, for example. A second ionomer of the multiple ionomers may be solution based, with a majority of particle diameters less than about 50 nm. The first and second ionomers may be the same type of ionomer or may be different types of ionomers.

FIG. 4B illustrates another exemplary process for forming a fuel cell electrode. According to this process, an electrode ink pre-mixture is formed 450 by combining the catalyst, electronic conductor and solvent. The pre-mixture ingredients are mixed 452, e.g., by ball milling, for a period of time, such as about 24 hours. After mixing the pre-mixture ingredients, a first ionic conductor, e.g., powdered ionomer particles comprising substantially smooth surfaced, hollow, spherical particles, a majority of which have diameters greater than 50 nm or greater than about 1 µm are added 454 to the pre-mixture. A second ionomer, e.g., having a majority of particles with diameters less than about 50 nm, may be used to form the pre-mixture, and/or may be added along with the first ionomer and/or may be added later in the process. After the first ionomer is added 454, the ink is mixed 456 for an additional time, e.g., about 30 minutes. Additional powdered or solution based ionic conductors may be added to the pre mixture and/or at a later stage in the process. The electrode ink is coated 458 on a substrate and dried 460. In some implementations, forming the ink may involve adding a first portion of an ionic conductor along with the catalyst, electronic conductor, and solvent, mixing, and then adding a second portion of the ionic conductor and mixing. Mixing can be accomplished by a variety of processes, including ball milling, stirring, shearing, sonication, etc.

Figure 5A:
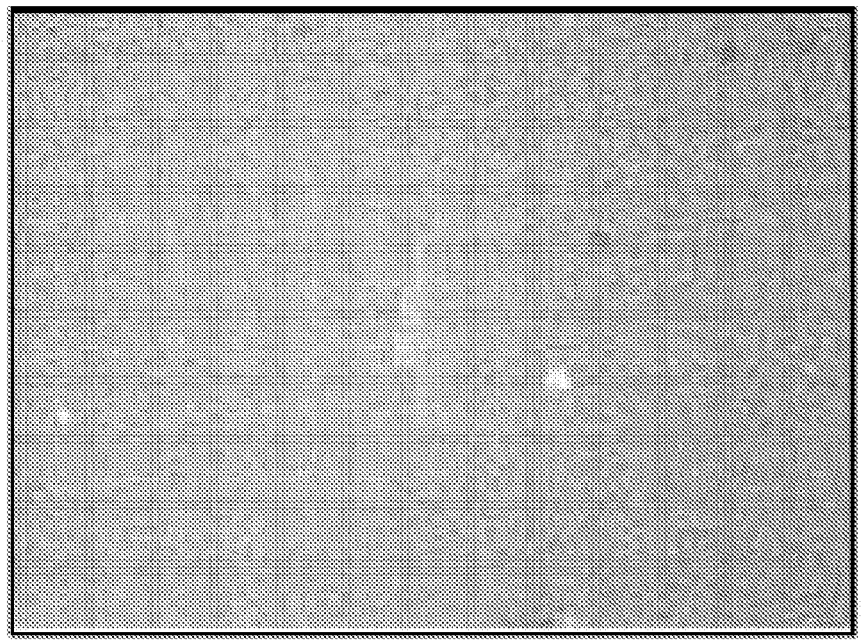
FIG. 5A is an optical image of a fuel cell electrode fabricated using a solution-based ionomer as the ionic conductor.
Figure 5B:
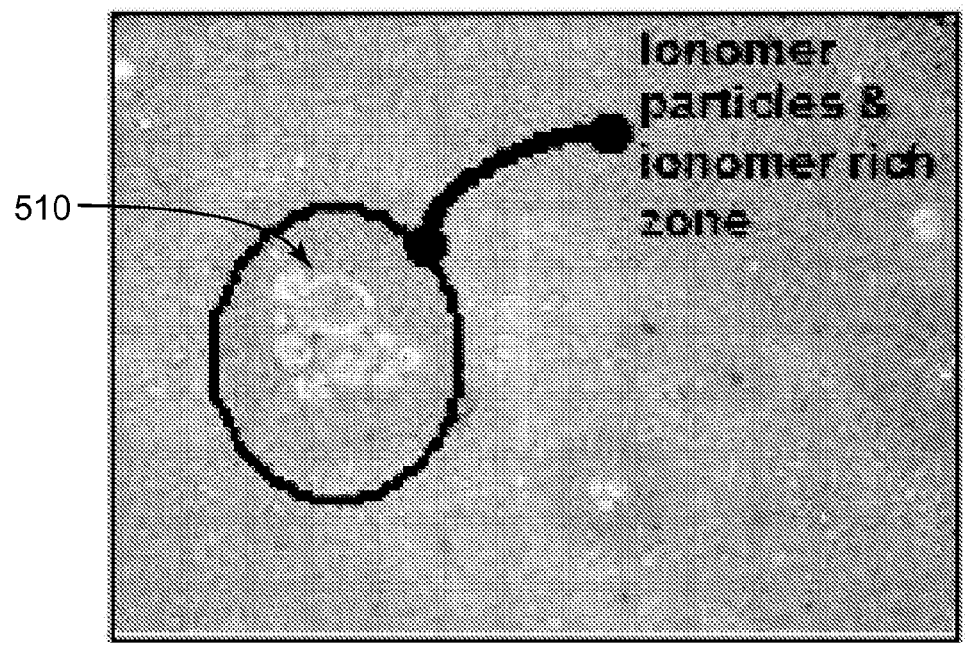
FIG. 5B is an optical image of a fuel cell electrode fabricated using a powder-based ionomer as the ionic conductor.

The electrode structure resulting from the processes described in connection with FIG. 4A or 4B may be used to form electrode layers having multiple ionomers and/or may be used to form electrode layers having discrete networks rich in an ionic conductor which are substantially separate and discrete from networks rich in an electronic conductor material. FIG. 5A is an optical image of the surface of a fuel cell electrode formed using a solution based ionic conductor comprising small particles, a majority of which have diameters less than about 50 nm. FIG. 5B is an optical image of the surface of a fuel cell electrode layer formed using a powdered ionomer which comprises larger particles, a majority of which have diameters greater than about 1 µm, and having substantially smooth, spheroid, hollow morphology. The optical image of FIG. 5B shows the larger ionomer particles which may form ionomer rich zones 510.

As previously discussed, when multiple ionomers are used, several different types of ionomers, or the same type of ionomer in several different forms may be used. At least one of the ionomers differs from the other ionomers in at least one characteristic. For example, using different types or forms of the ionomer may involve using different EW of what is otherwise the same type of ionomer and/or using the same ionomer having different particles sizes and/or different size ranges and/or different particle morphologies. For example, using multiple different types of ionomer may involve using PFIA as one of the multiple types of ionomer and using PFSA as another of the multiple types of ionomer. If different types of ionomer are used, each of the ionomers may have the same form, or each ionomer may a different form (e.g., one ionomer having small particles and the other ionomer having larger particles), and/or the multiple ionomers may comprise different EW materials. The same amount, measured for example, by volume or weight, of each ionomer or a different amount of each ionomer may be used in the electrode ink.

When forming the electrode, the different types or forms of ionomer may be added simultaneously or sequentially to the mixture. For example, sequentially adding the ionomers may involve forming an electrode ink using a first ionomer (e.g., according to the process described in connection with FIG. 4), grinding the electrode ink, and then mixing the ground electrode ink with a solvent and a second ionomer.

Spray drying is a useful method for forming a powdered ionomer that can be used to make fuel cell electrodes that include ionic conductor networks that are substantially discrete and separate from electronic conductor networks as depicted, for example, in FIG. 3B. As discussed in more detail in the examples below, powdered ionomer formed by spray drying has been shown to produce superior fuel cell electrodes when compared to powdered ionomer that is produced by other methods. More specifically, fuel cell electrodes fabricated using ionomer powder produced by spray drying have shown superior performance with compared to fuel cell electrodes fabricated using ionomer powder produced by cryogrinding, for example. The difference in performance between the electrodes formed using the spray dried ionomer powder and electrodes formed using other types of ionomer powder may be related to the morphology of the powder particles.

Figure 6:
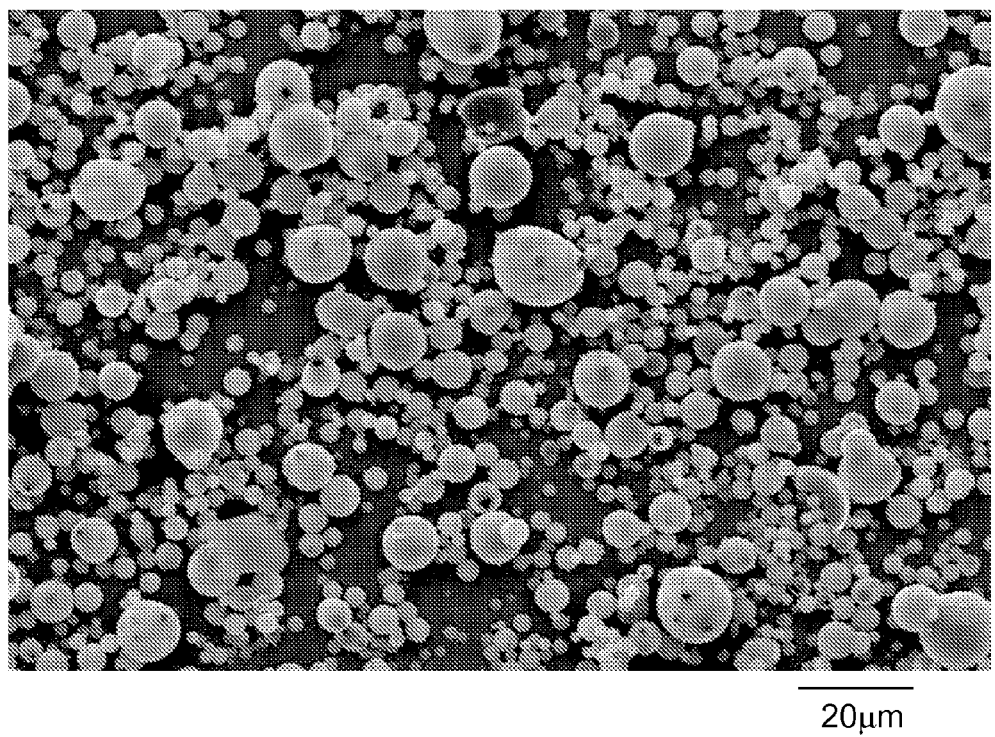
FIG. 6 is a scanning electron microscope (SEMS) image of an ionomer powder formed by spray drying.
Figure 7A:
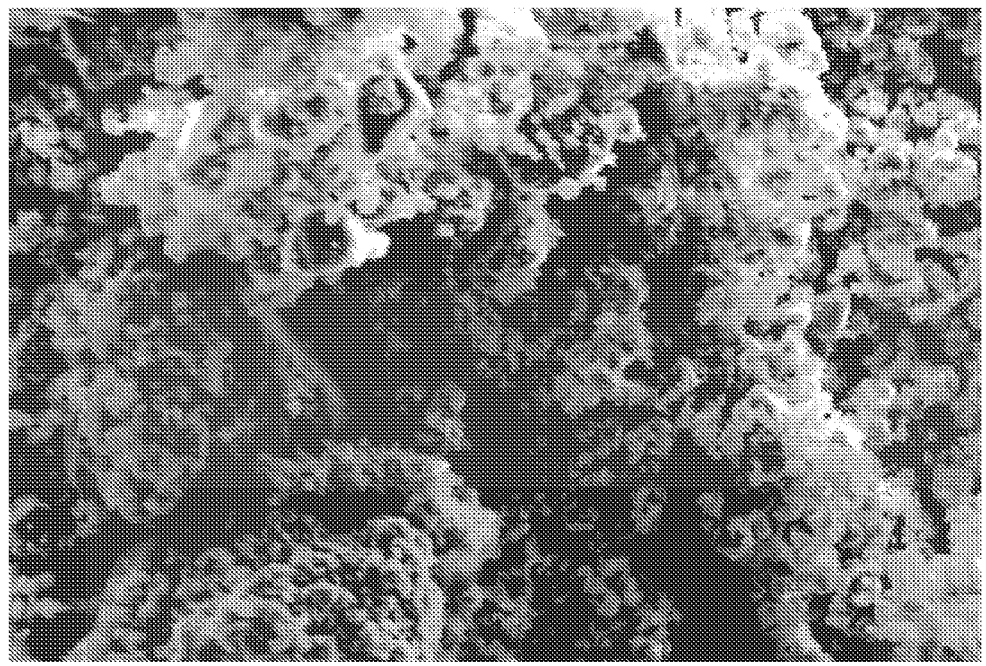
FIGS. 7A and 7B are scanning electron microscope (SEMS) images of an ionomer powder formed by cryogrinding.
Figure 7B:
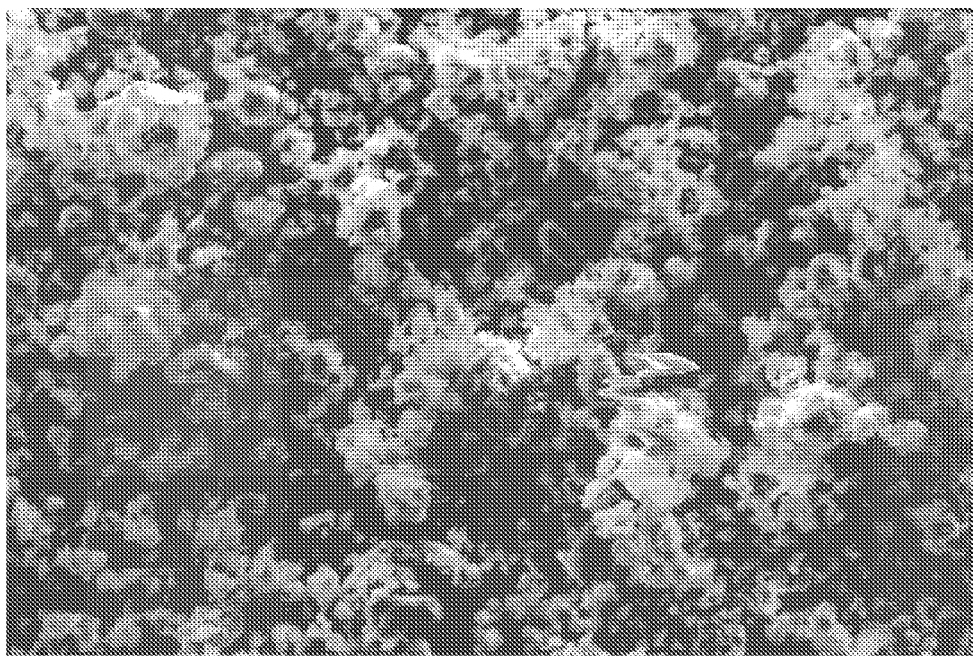

As illustrated in the scanning electron microscope (SEMS) image of FIG. 6, spray drying ionomer can produce powder particles that are spheroids, having outer surfaces that are substantially smooth and which are hollow. The term spheroid is used to describe a particle having a diameter that does not vary more than about 10%. The term "substantially smooth" is used to describe particles having surface roughness less that about 5% of the diameter of the particle.

The powdered ionomer particles produced by spray drying, for example, may range in size from about 50 nm to about 30 µm or may range from 50 nm to about 15 µm, or may range from about 1 µm to about 15 µm. The average diameter of the particles may be about 3.5 µm. The average size of the spray dried particles can be controlled within a range of less than 1 micron to greater than a 1 millimeter by changing the variables of the spray drying process, including spray velocity, solution concentration, and chamber temperature, for example. The diameter range can also be controlled by varying these processing parameters. A majority of the spray dried ionomer spheroids may be hollow. In some implementations, an additive, such as cerium and/or manganese compounds, may be used during the spray drying process and/or at other stages during formation of the electrode ink.

For example, spray drying to achieve ionomer particles having the characteristics described above may involve taking a dispersion of fluorinated polymer and water, atomizing the dispersion into small droplets of dispersion, then releasing the dispersion droplets into a heated gas (air) which dries the dispersion to produce flowable particles of polymer. These particles have a dry exterior surface but an internal residual moisture level of about 2% to 10%. The process variables for spray drying include: 1) % solids of the input dispersion, 2) atomization pressure of the feed, 3) feed rate, 4) inlet temperature of the heated gas (e.g., air), and 5) outlet temperature of the cooled gas. These variables affect the residual moisture level and/or the distribution of the measured particle size of the polymer powder. Exemplary ranges for the spray drying process variables that can produce ionomer particles as described herein include: 1) percent solids of dispersion in a range of about 9% to about 22%, or a range of about 18% to about 20%, 2) atomization pressure in a range from about 30 psi to about 60 psi, or a range of about 35 psi to about 40 psi, 3) feed rate (as measured by pump speed) in a range of about 50 rpm to about 140 rpm and adjusted based on % solids and outlet temperature, 4) inlet temperature in a range of about 160° C. to about 250° C., or about 185 to about 200° C., 5) outlet temperature in a range of about 65° C. to about 95° C., or about 85° C. to about 90° C.

Cryogrinding is another process that produces a powdered ionomer. However, in contrast to the smooth, hollow, spheroid ionomer particles shown in the SEMS image of FIG. 6, cryogrinding produces irregular particles with jagged surfaces, as illustrated in SEMS images FIGS. 7A and 7B. The size of the cryoground particles varies from very small dust-like particles of less than 1 micron to particles that exceed 20 microns.

The differences in the ionomer particle morphology, e.g., such as between particles formed by spray drying and particles formed by cryogrinding, may influence ink rheology and/or fuel cell electrode pore structure, and/or fuel cell electrode performance. The spheroid, substantially smooth, and hollow ionomer particles formed by spray drying appear to facilitate the formation of the discrete ionic conductor rich and electronic conductor rich networks within the fuel cell electrode.

Fuel cell electrodes must be capable of performing multiple functions over a wide range of operating conditions. The functions performed by the fuel cell electrodes include gas diffusion of fuel or oxidant, transport of liquid water, and electronic and ionic conduction through the electrode layer. Fuel cell electrodes need to perform these functions over a wide range of conditions from about −40 C to greater than about 10° C., with reactant gas humidity ranging from 0 to 100%.

The fuel cell electrode is required to efficiently and simultaneously perform multiple material transport and electrical conduction functions when the fuel cell is operating. These material transport and electrical conduction functions include diffusion of fuel gases or oxidant gases, transport of liquid water, and conduction of protons and electrons within the electrode layer. All of these functions may not be simultaneously and optimally accommodated in some fuel cell electrodes that have a substantially uniform distribution of a single type of ionic conductor. The ability with which the electrode layer can transport liquid water is of particular interest with respect to the cathode electrode where water is formed. Within the porous layers of a fuel cell electrode, for example, enough pores must be sufficiently hydrophobic to prevent liquid water from filling too much of the layer. Overfilling of the layers or regions within the layer with liquid water is typically known as "flooding". The flooding of pores prevents reactant gases from penetrating the electrode and reaching catalyst sites, resulting in performance loss.

An overly hydrophobic layer is also not ideal for fuel cell operation. At cool temperatures, water must migrate from the electrodes to the flow field as a liquid. If the layer through which the water migrates is too hydrophobic, there are no liquid connections through which water can readily move. The water must percolate from pore to pore, a process which requires significant build up of liquid pressure. This high liquid pressure results in flooding of pores, reduction of gas transport and loss of fuel cell performance. Appropriate engineering of hydrophilic and hydrophobic pores can provide both liquid water and gas transport simultaneously.

Substantially uniform distribution of small diameter ionic conductor particles within a fuel cell electrode may produce small pore sizes within the electrode layer, resulting in compromised liquid transport and/or gas diffusion. Poor ionic and/or electronic conduction may occur due to narrow pathways through the well mixed, small particle size ionomer, electronic conductor, and catalyst. Substantially uniform distribution of the ionomer may result in reduced pathways for liquid transport due to the slightly hydrophilic properties of the ionomer. Water transport may be poor due to limitations on the maximum amount of ionomer allowed in an electrode before flooding. Electron conduction may be reduced due to poor carbon-carbon contact.

For optimal performance, the fuel cell electrodes need to provide a porous layer that readily conducts gases to reaction sites within the electrodes and also transports liquid water away from the reaction sites. The electrode layer should have sufficient hydrophilicity to allow easy liquid water transport yet sufficient hydrophobicity to prevent flooding of the pores by the liquid water. Regions of excessive hydrophobicity may create a "wall" with the electrode that requires high liquid pressure for the liquid water to break through the wall. A buildup of liquid pressure behind the wall may create flooding of other regions, which prevents fuel gases from reaching the reaction sites. If the fuel cell electrode includes hydrophilic regions of sufficient number and size, flooding can be prevented.

Fuel cell electrodes must include a sufficient amount of ionic conductor to allow rapid ion conduction to the reaction sites (in the cathode electrode) and to allow rapid ion conduction away from the reaction sites (in the anode electrode). However the fuel cell electrode must also include a sufficient amount of electronic conductor to allow rapid electron conduction to the reaction sites (in the cathode electrode) and rapid electron conduction away from the reaction sites (in the anode electrode).

Fuel cell electrodes having discrete ionic and/or electronic conductor networks can provide superior liquid and gas transport, hydrophobicity, hydrophilicity, and electron an ion conduction when compared with fuel cell electrodes having substantially uniformly distributed ionic and electronic conductor materials.

The use of ionomer particles that are generally greater than about 1 μm in diameter in the fuel cell ink appears to facilitate the formation of ionic and electronic conductor networks. Furthermore, the morphology of particles used in the fuel cell ink may also be a factor, with the substantially smooth and hollow spheroid particles produced by the spray drying process providing superior characteristics when compared to the jagged, irregular particles produced by cryogrinding. The narrower size range of the spray dried powder particles (in contrast with the wider size range of the cyroground powder particles) may also contribute to enhanced electrode performance.

The smooth, hollow spheroids produced by spray drying appear to promote agglomerations of the ionomer powder particles and creation of ionic conductor rich networks (which are relatively electronic conductor poor). For example, when catalyst coated carbon is used as the catalyst and electronic conductor, the electronic conductor rich regions contain non-oxidized carbon (natural C) which is hydrophobic. The carbon rich regions that ideally substantially traverse the electrode layer provide pathways that facilitate electronic conduction and also provide networks of low liquid water content, thus allowing fast gas transport. The ionic conductor rich regions are moderately hydrophilic. Uniform distribution of the ionic conductor is subject to the formation of pockets of flooding. However ionic conductor rich networks that substantially traverse across the electrode layer provide pathways for rapid proton and water conduction.

As previously discussed, the ionic conductor networks and electronic conductor networks can provide complementary functions with the fuel cell electrode. When these complementary networks are present in the electrode layer, the conflicting performance constraints of optimal electrode design (fuel and oxidant gas transport, liquid water transport, and electron and proton conduction) can be better accommodated. The presence of the electronic and ionic conductor networks serve to maintain fuel cell performance by facilitating transport of gases to and from the reaction sites and conduction of ions and electrons to and from the reaction sites of the electrode layer. The ionic conductor and electronic conductor networks can provide an extended operating range for the fuel cell. For example, because liquid water transport is improved along the ionic conductor networks, a lower EW ionomer may be used as the ionic conductor. The lower EW material achieves better performance in hotter, drier conditions, while preventing flooding at colder, wetter conditions. Alternatively, the addition of a higher EW ionomer may be used to increase the durability of the electrode layer.

Objects and advantages of this disclosure are further illustrated by the following examples, but the particular materials and amounts thereof recited in these examples, as well as other conditions and details, should not be construed to unduly limit this disclosure.

EXAMPLES

MEAs having four different types of fuel cell cathode electrodes were constructed and tested. The MEAs were produced by the same process, using identical materials, except for the cathode electrode. The different cathode electrode types were formed from 1) electrodes formed using a solution-based ionomer (SOLN, SOLN 2) having relatively small size particles (e.g., diameters less than 50 nm) in solution, 2) electrodes formed using a spray dried ionomer powder (PDR, PDR 2), (see FIG. 6 and associated discussion), 3) electrodes formed by pre-mixing the catalyst/electronic conductor prior to combining the spray dried ionomer powder (PDR postBM), and 4) electrodes formed using a cryoground powder (cryoPDR) (see FIGS. 7A and 7B and associated discussion). The fabrication parameters of the test MEAs are provided in Table 1. The SOLN electrodes formed using the solution based ionomer were fabricated by the process outlined in the flowchart of FIG. 4A. The PDR electrodes formed using the spray dried ionomer powder were fabricated by the process outlined in FIG. 4A. The PDR post BM electrode was fabricated by process outlined in FIG. 4B. The electrode formed using the cryo ground ionomer powder was fabricated by process outlined in FIG. 4A.

TABLE 1

|  | MEA with solution-based ionomer electrode (SOLN) | MEA with cryoground powdered ionomer electrode (cryoPDR) | MEA with spray dried powdered ionomer electrode (PDR) | MEA with spray dried powdered ionomer electrode post ball milled (PDR post BM) |
|---|---|---|---|---|
| Cathode design variables | | | | |
| Ionomer/Catalyst weight ratio | 0.8 | 0.8 | 0.8 | 0.8 |
| Ionomer | 3M800EW (available from 3M Company, St. Paul, MN, USA) | 3M800EW | 3M800EW | 3M800EW |
| Form of ionomer used for electrode | Aqueous solution | Cryoground powder | Spray dried powder | Spray dried powder |
| Catalyst | TKK 10V30E (available from Tanaka Kikinzoku Kogyo (TKK), Tokyo, Japan) | TKK 10V30E | TKK 10V30E | TKK 10V30E |
| Ink mixing technique | Ball milling after combining all components | Ball milling after combining all components | Ball milling after combining all components | 2 step ball milling process ionomer added after ball milling catalyst and solvent |
| Solvent | Aqueous | Aqueous | Aqueous | Aqueous |
| Ink solids content | 20% | 20% | 20% | 20% |

TABLE 1-continued

|  | MEA with solution-based ionomer electrode (SOLN) | MEA with cryoground powdered ionomer electrode (cryoPDR) | MEA with spray dried powdered ionomer electrode (PDR) | MEA with spray dried powdered ionomer electrode post ball milled (PDR post BM) |
|---|---|---|---|---|
| Catalyst loading (mg Pt/cm2) | 0.3 | 0.3 | 0.3 | 0.3 |
| Electrode coating method | Hand painting | Hand painting | Hand painting | Hand painting |
| Annealing | 150 C, 30 min. | 150 C, 30 min. | 150 C, 30 min. | 150 C, 30 min. |
| | | Anode design variables | | |
| Ionomer/Catalyst ratio | 0.8 | 0.8 | 0.8 | 0.8 |
| Ionomer | 3M1000EW (available from 3M Company, St. Paul, MN, USA) | 3M1000EW | 3M1000EW | 3M1000EW |
| Form of ionomer used for electrode | Aqueous solution-based ionomer | Aqueous solution-based ionomer | Aqueous solution-based ionomer | Aqueous solution-based ionomer |
| Catalyst | TKK 10V30E | TKK 10V30E | TKK 10V30E | TKK 10V30E |
| Ink mixing technique | Ball milling | Ball milling | Ball milling | Ball milling |
| Solvent | Aqueous | Aqueous | Aqueous | Aqueous |
| Ink solids content | 20% | 20% | 20% | 20% |
| Catalyst loading (mg Pt/cm2) | 0.1 | 0.1 | 0.1 | 0.1 |
| Electrode coating method | Hand painting | Hand painting | Hand painting | Hand painting |
| Annealing | 150 C, 30 min. | 150 C, 30 min. | 150 C, 30 min. | 150 C, 30 min. |
| | | Anode Design Variables | | |
| GDL type | Hydrophobized carbon paper with microporous layer | Hydrophobized carbon paper with microporous layer | Hydrophobized carbon paper with microporous layer | Hydrophobized carbon paper with microporous layer |
| | | Membrane Design Variables | | |
| Membrane material | 3M800EW | 3M800EW | 3M800EW | 3M800EW |
| Thickness | 0.8 mil | 0.8 mil | 0.8 mil | 0.8 mil |

In one analysis, the MEAs with the spray dried powdered ionomer electrodes (denoted PDR) were compared to the MEAs having solution based ionomer electrodes (denoted SOLN). Three MEAs were made using the spray dried powdered ionomer and three MEAs were constructed using the solution based ionomer for each trial. Two trials of each of the three MEAs constructed were completed for each group. The results of the first trial of the spray dried powdered ionomer electrode group are denoted PDR; the results of the second trial of the spray dried powdered ionomer electrode group are denoted PDR 2; the results of the first trial of the solution based ionomer electrode group are denoted SOLN; the results of the second trial of the solution based ionomer electrode group are denoted SOLN 2.

Catalytic Activity:

Catalyst activity was measured and is shown for MEAs with the spray dried powder ionomer electrodes and the solution based ionomer electrodes in Table 2. The catalyst activity of the powder based electrodes shows improvement when compared with the catalyst activity of the solution based electrodes. These activity gains may be explained by better three phase interface (catalyst, ionomer, and reactant gas) created by the powder based ionomer electrodes.

TABLE 2

| Fuel cell | Type | Loading mg/cm2 | SEF (cm2/cm2) | Catalyst Activity (m2/g) |
|---|---|---|---|---|
| 1 | solution | 0.283 | 129 | 45.58 |
| 2 | solution | 0.315 | 139 | 44.12 |
| 3 | solution | 0.298 | 126 | 42.28 |
| 4 | spray dried powder | 0.294 | 156 | 53.06 |
| 5 | spray dried powder | 0.291 | 153 | 52.58 |
| 6 | spray dried powder | 0.295 | 154 | 52.20 |

Galvano-dynamic polarization scanning (GDS) analysis:

FIG. 8 shows the GDS polarization performance results for two trials of the MEAs with solution-based ionomer electrodes (SOLN. SOLN 2) and the powder-based ionomer electrodes (PDR, PDR 2). The test conditions were as follows: cell temperature=70 C, anode and cathode inlet humidification=100%, ambient operating pressure, fuel (H2) stoichiometric ratio=1.4, oxidant (air) stoichiometric ratio=2.5. For a given current density, the powder-based ionomer electrodes show higher voltages than the solution-based ionomer electrodes. This benefit is more significant at high current densities.

FIG. 9 compares the MEA performance of the SOLN and PDR electrodes at a current density of 1.2 A/cm2 and 1.5 A/cm2. The data illustrated in FIG. 9 indicates that higher cell voltages are achieved by the spray dried powdered ionomer electrodes (PDR, PDR 2) than the solution-based electrodes (SOLN, SOLN 2) at higher current densities. Note that data at 1.5 A/cm2 was only recorded for the second trial of electrodes (SOLN 2, PDR 2).

A follow up analysis was performed to compare various properties of spray dried powdered ionomer electrodes formed by adding ink components together and mixing (denoted PDR), spray dried powdered ionomer electrodes formed by pre-mixing Pt coated carbon and solvent (water) prior to adding the spray dried powdered ionomer (denoted PDR post BM), cryoground powdered ionomer electrodes (denoted cryoPDR), and solution based ionomer electrodes (denoted SOLN).

Figure 10:
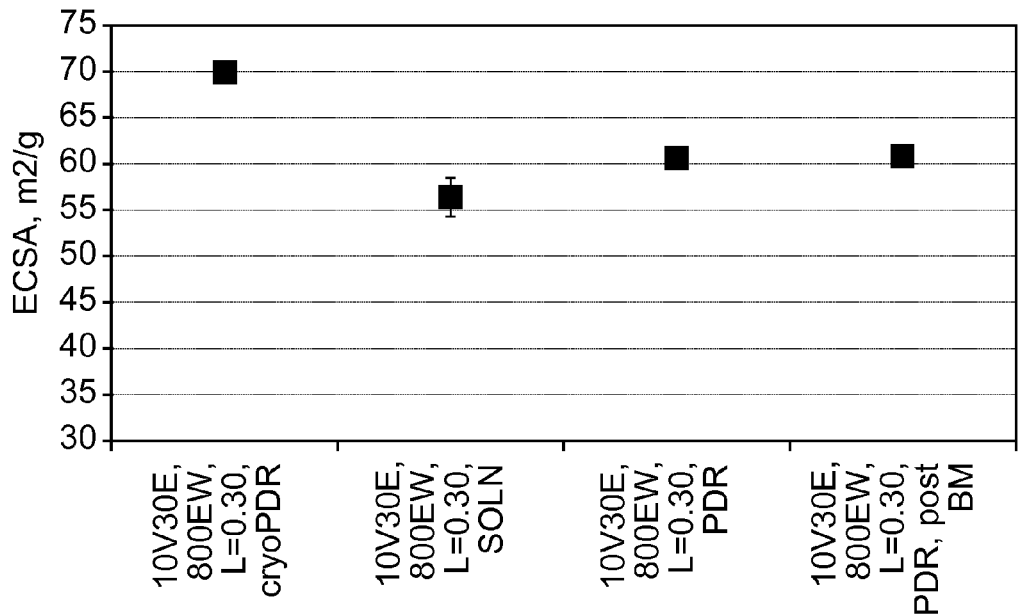
FIG. 10 provides a comparison of the electrochemical surface area of solution-based ionomer electrodes and powder-based ionomer electrodes.

Electrochemical Surface Area:

The electrochemical surface area (ECSA) of the catalyst was analyzed for each of the electrode types PDR, PDR post BM, cryoPDR, SOLN listed in the preceding paragraph. The ECSA analysis provides the catalyst surface that is available to contribute to the fuel cell reaction. A larger ECSA is associated with better fuel cell performance. The ECSA was performed for electrodes under the following test conditions: 40 C cell temperature, 70 C dew point (anode and cathode); H2/N2 (anode/cathode), flow rate 800/500 SCCM anode/cathode. The ECSA readings were taken at 50 mV/s scan rate from 0.05 to 0.80 V. The graph of FIG. 10 provides a comparison of the electrochemical surface area of the electrode types listed above. As can be appreciated from FIG. 10, the cryoground powdered ionomer (cryoPDR) electrodes show the highest ECSA at 70 m2/g Pt. Both the PDR electrodes and the PDR post BM electrodes also show ECSA improvements over the solution based (SOLN) ionomer electrodes.

Figure 11:
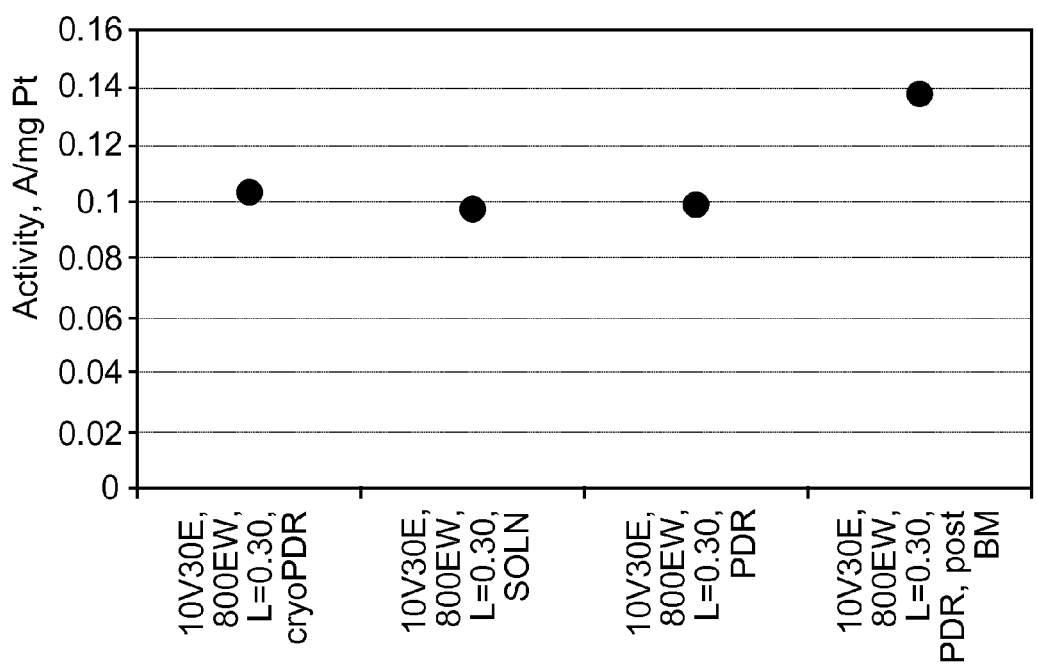
FIG. 11 provides a comparison of the catalytic activity of electrodes formed using solution-based ionomer, cryoground powdered ionomer, spray dried powdered ionomer, and spray dried powdered ionomer with a premixture of electronic conductor and solvent.

Catalytic Activity:

The catalytic activity at 0.9 V was measured for each MEA under the following conditions: T=80 C, 100% RH, H2/O2 (anode/cathode), 7.5/7.5 psig pressure (anode cathode). The catalytic activity measurements for the MEAs are provided in FIG. 11. The cryo ground powdered ionomer electrode performed better than the solution based ionomer electrode in this test. The spray dried powdered ionomer electrodes (PDR and PDR post BM) exhibited more catalytic activity on average per unit mass than the cryo ground powdered ionomer electrodes and the solution based ionomer electrodes.

Figure 12:
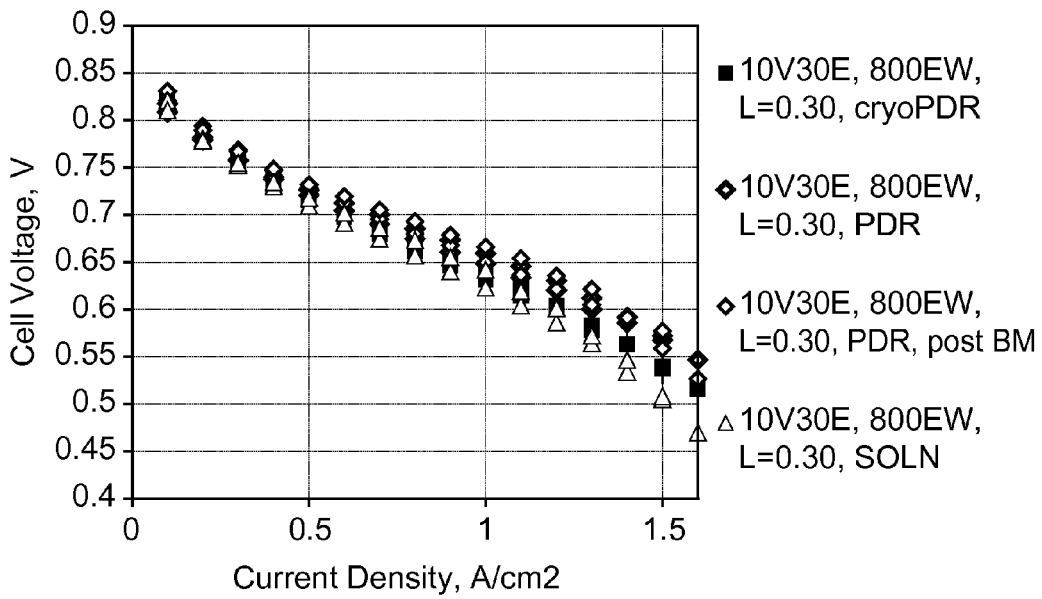
FIG. 12 shows comparative polarization curves for electrodes formed using solution-based ionomer, cryoground powdered ionomer, spray dried powdered ionomer, and spray dried powdered ionomer with a premixture of electronic conductor and solvent.
Figure 13:
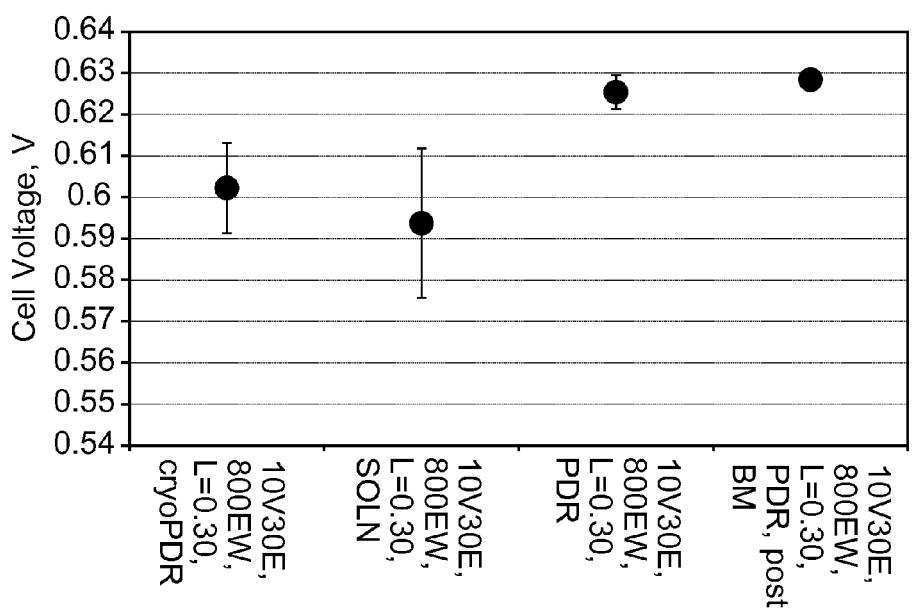
FIG. 13 shows MEA performance at a current density of 1.2 A/cm$^2$ for electrodes formed using solution-based ionomer, cryoground powdered ionomer, spray dried powdered ionomer, and spray dried powdered ionomer with a premixture of electronic conductor and solvent.

Follow-Up Galvano-Dynamic Polarization Scanning (GDS):

Galvano-dynamic polarization scanning was performed for MEAs having SOLN, PDR, cryoPDR and PDR post BM electrodes. The test conditions were as follows: cell temperature=70 C, anode and cathode inlet humidification=100%, ambient operating pressure, fuel (H2) stoichiometric ratio=1.7, oxidant (air) stoichiometric ratio=2.5. FIG. 12 shows the GDS polarization curve for the SOLN, PDR, cryoPDR and PDR post BM MEAs. FIG. 13 provides the MEA performance at a current density of 1.2 A/cm2 for each type of electrode. In this analysis, all of the powder based electrodes outperformed the solution based electrodes. The PDR and PDR post BM show the greatest improvement over the solution based electrodes and were exhibited improved high current density over that of the cryoPDR electrodes.

Objects and advantages of this disclosure are further illustrated by the following listing of representative embodiments, but the particular materials, amounts, conditions and details, recited in these embodiments should not be construed to unduly limit this disclosure.

EMBODIMENTS

Embodiment 1 is a fuel cell subassembly, comprising:
an electrode layer, comprising:
a catalyst;
an electronic conductor;
an ionic conductor;
a plurality of electronic conductor rich networks within the electrode layer; and
a plurality of ionic conductor rich networks within the electrode layer and interspersed with the electronic conductor rich networks, wherein a volume ratio of the ionic conductor to the electronic conductor is greater in the ionic conductor rich networks than in the electronic conductor rich networks.

Embodiment 2 is the fuel cell subassembly of embodiment 1, wherein, during operation of a fuel cell that includes the fuel cell subassembly, conduction of electrons occurs predominantly within the electronic conductor rich networks and conduction of ions occurs predominantly within the ionic conductor rich networks.

Embodiment 3 is the fuel cell subassembly of embodiment 1, wherein the ionic conductor comprises particles of a spray dried ion conducting polymer.

Embodiment 4 is the fuel cell subassembly of embodiment 1, wherein the ionic conductor comprises particles and a majority of the particles have an outer surface that is substantially smooth.

Embodiment 5 is the fuel cell subassembly of embodiment 1, wherein the ionic conductor comprises particles and a majority of the particles are spheroids having a variation in diameter of less than about 10%.

Embodiment 6 the fuel cell subassembly of embodiment 1, wherein the ionic conductor comprises particles and a majority of the particles are hollow.

Embodiment 7 is the fuel cell subassembly of embodiment 1, wherein the ionic conductor comprises particles and a majority of the particles have diameters in a range of about 1 μm to about 15 μm.

Embodiment 8 is the fuel cell subassembly of embodiment 1, wherein the electronic conductor comprises electronic conductor particles and the catalyst is disposed on the electronic conductor particles.

Embodiment 9 is the fuel cell subassembly of embodiment 1, wherein the catalyst is disposed on nanostructured supports.

Embodiment 10 is the fuel cell subassembly of embodiment 1, wherein the electronic conductor comprises one or more of carbon, tin oxide, and titanium oxide.

Embodiment 11 is the fuel cell subassembly of embodiment 1, wherein the catalyst comprises one or more of platinum, palladium, bimetals, metallic alloys, and carbon nanotubes.

Embodiment 12 is the fuel cell subassembly of embodiment 1, wherein the ionic conductor comprises a first ion conducting polymer and the electrode layer further comprises a second ionic conductor comprising a second ion conducting polymer.

Embodiment 13 is the fuel cell subassembly of embodiment 12, wherein the first ion conducting polymer has a first equivalent weight and the second ion conducting polymer has a second equivalent weight.

Embodiment 14 is the fuel cell subassembly of embodiment 12, wherein:
the first ion conducting polymer comprises particles, and a majority of the particles of the first ion conducting polymer have diameters greater than about 1 μm; and the second ion conducting polymer comprises particles, and a majority of the particles of the second ion conducting polymer have diameters less than about 50 nm.

Embodiment 15 is the fuel cell subassembly of embodiment 14, wherein the particles of the second ion conducting polymer form a film on the electronic conductor and the particles of the first ion conducting polymer comprise a majority of the volume of the ionic conductor.

Embodiment 16 is the fuel cell subassembly of embodiment 14, wherein the first ion conducting polymer substantially forms the ion conducting networks.

Embodiment 17 is the fuel cell subassembly of embodiment 1, wherein the electrode layer is disposed on an electrolyte membrane.

Embodiment 18 is the fuel cell subassembly of embodiment 1, wherein the electrode layer is disposed on a gas diffusion layer.

Embodiment 19 is the fuel cell subassembly of embodiment 1, wherein the electrode layer is disposed between a first surface of an electrolyte membrane and a first gas diffusion layer, the fuel cell subassembly further comprising additional components of a membrane electrode assembly (MEA) including a second electrode layer disposed between a second surface of the electrolyte membrane and a second gas diffusion layer.

Embodiment 20 is the fuel cell subassembly of embodiment 19, further comprising:
 a first flow field plate disposed proximate the first gas diffusion layer; and
 a second flow field plate disposed proximate the second gas diffusion layer.

Embodiment 21 is the fuel cell subassembly of embodiment 19, further comprising multiple MEAs arranged to form a fuel cell stack.

Embodiment 22 is a method of making a fuel cell electrode layer, comprising:
 combining an ionic conductor, an electronic conductor, a catalyst, and a solvent, the ionic conductor comprising spheroid particles, a majority of the particles having diameters greater than about 50 nm;
 mixing the ionic conductor, the electronic conductor, the catalyst and the solvent for a period of time to form an electrode ink; and
 coating the electrode ink on a substrate to form the fuel cell electrode layer.

Embodiment 23 is the method of embodiment 22, wherein a majority of the particles have a diameter greater than about 1 µm.

Embodiment 24 is the method of embodiment 22, wherein the particles have a diameter range between about 50 nm to about 15 µm.

Embodiment 25 is the method of embodiment 22, wherein the electronic conductor is coated with the catalyst.

Embodiment 26 is the method of embodiment 22, wherein the catalyst disposed on support structures.

Embodiment 27 is the method of embodiment 22, wherein the catalyst is disposed on nanostructured supports.

Embodiment 28 is the method of embodiment 22, wherein the substrate comprises an electrolyte membrane.

Embodiment 29 is the method of embodiment 22, wherein the substrate comprises a gas diffusion layer.

Embodiment 30 is the method of embodiment 22, wherein the particles comprise spray dried ionomer particles.

Embodiment 31 is the method of embodiment 22, wherein a majority of the particles are spheroids.

Embodiment 32 is the method of embodiment 22, wherein a majority of the particles have a substantially smooth surface.

Embodiment 33 is the method of embodiment 22, wherein a majority of the particles are hollow.

Embodiment 34 is the method of embodiment 22, wherein combining the ionic conductor, the electronic conductor, the catalyst and the solvent comprises substantially contemporaneously combining the ionic conductor, the electronic conductor, and the solvent prior to the mixing.

Embodiment 35 is the method of embodiment 22, wherein combining the ionic conductor, the electronic conductor, the catalyst and the solvent comprises:
 forming a pre-mixture that includes the electronic conductor and the solvent;
 mixing the pre-mixture for a period of time;
 after mixing the pre-mixture, adding the ionic conductor to the pre-mixture; and
 mixing the ionic conductor and the pre-mixture for a period of time.

Embodiment 36 is the method of embodiment 22, further comprising after mixing the ionic conductor, the electronic conductor, and the solvent, adding a second type of ionic conductor with the mixture of the ionic conductor, the electronic conductor, and the solvent.

Embodiment 37 is the method of embodiment 22, wherein the ionic conductor comprises a first type of ion conducting polymer and a second type of ion conducting polymer.

Embodiment 38 is the method of embodiment 22, wherein the ionic conductor comprises a first form of an ion conducting polymer and a second form of the ion conducting polymer.

Embodiment 39 is the method of embodiment 22, wherein the ionic conductor comprises a first equivalent weight ionic conductor and a second equivalent weight ionic conductor.

Embodiment 40 is the method of embodiment 22, wherein the ionic conductor comprises:
 particles of a first ion conducting polymer, a majority of the particles of the first ion conducting polymer having diameters greater than about 1 µm; and
 particles of a second ion conducting polymer, a majority of the particles of the second ion conducting polymer having diameters less than about 50 nm.

Embodiment 41 is the method of embodiment 40, wherein a volume of the first ion conducting polymer is greater that a volume of the second ion conducting polymer.

Embodiment 42 is the method of embodiment 41, wherein particles of the second ion conducting polymer coat the electronic conductor.

Embodiment 43 is the method of embodiment 22, further comprising forming the ionic conductor by spray drying an ion conducting polymer.

Embodiment 44 is the method of embodiment 43, wherein forming the ionic conductor by spray drying the ion conducting polymer comprises adding an additive to the ion conducting polymer prior to or during the spray drying.

Embodiment 45 is the method of embodiment 44, wherein the additive comprises one or more of cerium and manganese compounds.

Embodiment 46 is the method of embodiment 22, wherein combining comprises one or more of ball mixing, stirring, and sonication.

Embodiment 47 is the method of embodiment 22, wherein the solvent comprises one or more of a hydrocarbon and water.

Embodiment 48 is a fuel cell subassembly, comprising:
 an electrode layer, comprising:
  a catalyst;
  an electronic conductor;
  an ionic conductor intermixed with the electronic conductor and the catalyst and comprising particles, a majority of the particles being spheroid particles having diameters greater than about 50 nm.

Embodiment 49 is the fuel cell subassembly of embodiment 48, wherein a majority of the particles of the ionic conductor have a substantially smooth outer surface.

Embodiment 50 is the fuel cell subassembly of embodiment 48, wherein a majority of the particles are hollow.

Embodiment 51 is the fuel cell subassembly of embodiment 48, wherein a majority of the particles have diameters in a range of about 1 µm to about 15 µm.

Embodiment 52 is the fuel cell subassembly of embodiment 48, wherein the catalyst is disposed on the electronic conductor.

Embodiment 53 is the fuel cell subassembly of embodiment 48, wherein the catalyst is disposed on nanostructured supports.

Embodiment 55 is the fuel cell subassembly of embodiment 48, wherein the ionic conductor comprises one or more of perfluorinated sulfonic acid and perfluorinated imide acid.

Embodiment 56 is the fuel cell subassembly of embodiment 48, further comprising a second ionic conductor.

Embodiment 57 is the fuel cell subassembly of embodiment 56, wherein the ionic conductor has a first equivalent weight and the second ionic conductor has a second equivalent weight.

Embodiment 58 is the fuel cell subassembly of embodiment 56, wherein the second ionic conductor comprises particles, and a majority of the particles of the second ionic conductor have diameters less than about 50 nm.

Embodiment 59 is the fuel cell subassembly of embodiment 48, wherein a majority of the particles of the ionic conductor are non-uniformly distributed within the electrode layer.

Embodiment 60 is the fuel cell subassembly of embodiment 48, wherein the electrode layer is disposed on an electrolyte membrane.

Embodiment 61 is the fuel cell subassembly of embodiment 48, wherein the electrode layer is disposed on a gas diffusion layer.

Embodiment 62 is the fuel cell subassembly of embodiment 48, wherein the electrode layer is disposed between a first surface of an electrolyte membrane and a first gas diffusion layer, the fuel cell subassembly further comprising additional components of a membrane electrode assembly (MEA) including a second electrode layer disposed between a second surface of the electrolyte membrane and a second gas diffusion layer.

Embodiment 63 is the fuel cell subassembly of embodiment 62, further comprising:
  a first flow field plate disposed proximate the first gas diffusion layer; and
  a second flow field plate disposed proximate the second gas diffusion layer.

Embodiment 64 is the fuel cell subassembly of embodiment 62, further comprising multiple MEAs arranged to form a fuel cell stack.

Embodiment 65 is a fuel cell electrode layer, comprising:
  a catalyst;
  an electronic conductor; and
  a first ionic conductor; and
  a second ionic conductor, wherein the first ionic conductor is different from the second ionic conductor and the first ionic conductor and the second ionic conductor are interspersed with each other, the electronic conductor, and the catalyst within the electrode layer.

Embodiment 66 is the electrode layer of embodiment 65, wherein the first ionic conductor and the second ionic conductor are different types of ionic conductor.

Embodiment 67 is the electrode layer of embodiment 65, wherein the first ionic conductor and the second ionic conductor are different forms of the same type of ionic conductor.

Embodiment 68 is the electrode layer of embodiment 65, wherein the first ionic conductor has a first equivalent weight and the second ionic conductor has a second equivalent weight.

Embodiment 69 is the electrode layer of embodiment 65, wherein particles of the second ionic conductor coat the electronic conductor.

Embodiment 70 is the electrode layer of embodiment 65, wherein particles of the second ionic conductor are substantially smaller than particles of the first ionic conductor.

Embodiment 71 is the electrode layer of embodiment 65, wherein a majority of particles of the second ionic conductor have diameters less than about 50 nm and particles of the first ionic conductor are powdered spray dried particles or powdered cryoground particles.

Embodiment 72 is the electrode layer of embodiment 65, wherein particles of one or both of the first ionic conductor and the second ionic conductor are non-uniformly distributed in the electrode layer.

Embodiment 73 is the fuel cell subassembly of embodiment 1, wherein the ionic conductor comprises particles and a majority of the particles have diameters in a range of 1 µm to 15 µm.

Embodiment 74 is the fuel cell subassembly of embodiment 1, wherein the ionic conductor comprises particles and a majority of the particles have diameters in a range of 1.5 µm to 14 µm.

Embodiment 75 is the fuel cell subassembly of embodiment 1, wherein the ionic conductor comprises particles and a majority of the particles have diameters in a range of 2 µm to 12 µm.

Embodiment 76 is the fuel cell subassembly of embodiment 12, wherein:
  the first ion conducting polymer comprises particles, and a majority of the particles of the first ion conducting polymer have diameters greater than 1 µm; and
  the second ion conducting polymer comprises particles, and a majority of the particles of the second ion conducting polymer have diameters less than 50 nm.

Embodiment 77 is the fuel cell subassembly of embodiment 12, wherein:
  the first ion conducting polymer comprises particles, and a majority of the particles of the first ion conducting polymer have diameters greater than 1.5 µm; and
  the second ion conducting polymer comprises particles, and a majority of the particles of the second ion conducting polymer have diameters less than 50 nm.

Embodiment 78 is the fuel cell subassembly of embodiment 12, wherein:
  the first ion conducting polymer comprises particles, and a majority of the particles of the first ion conducting polymer have diameters greater than 1 µm; and
  the second ion conducting polymer comprises particles, and a majority of the particles of the second ion conducting polymer have diameters less than 40 nm.

Embodiment 79 is the fuel cell subassembly of embodiment 12, wherein:
  the first ion conducting polymer comprises particles, and a majority of the particles of the first ion conducting polymer have diameters greater than 1.5 µm; and
  the second ion conducting polymer comprises particles, and a majority of the particles of the second ion conducting polymer have diameters less than 40 nm.

Embodiment 80 is the method of embodiment 22, wherein a majority of the particles have a diameter greater than 50 nm.
Embodiment 81 is the method of embodiment 22, wherein a majority of the particles have a diameter greater than 75 nm.
Embodiment 82 is the method of embodiment 22, wherein a majority of the particles have a diameter greater than 1 µm.
Embodiment 83 is the method of embodiment 22, wherein a majority of the particles have a diameter greater than 1.5 µm.
Embodiment 84 is the method of embodiment 22, wherein the particles have a diameter range between 50 nm to 15 µm.
Embodiment 85 is the method of embodiment 22, wherein the particles have a diameter range between 50 nm to 12 µm.
Embodiment 86 is the method of embodiment 22, wherein the particles have a diameter range between 75 nm to 12 µm.
Embodiment 87 is the method of embodiment 22, wherein the particles have a diameter range between 1 µm to 12 µm.
Embodiment 88 is the method of embodiment 22, wherein the particles have a diameter range between 1.5 µm to 12 µm.
Embodiment 89 is the method of embodiment 22, wherein the ionic conductor comprises:
    particles of a first ion conducting polymer, a majority of the particles of the first ion conducting polymer having diameters greater than 1 µm; and
    particles of a second ion conducting polymer, a majority of the particles of the second ion conducting polymer having diameters less than 50 nm.
Embodiment 90 is the method of embodiment 22, wherein the ionic conductor comprises:
    particles of a first ion conducting polymer, a majority of the particles of the first ion conducting polymer having diameters greater than 1.5 µm; and
    particles of a second ion conducting polymer, a majority of the particles of the second ion conducting polymer having diameters less than 50 nm.
Embodiment 91 is the method of embodiment 22, wherein the ionic conductor comprises:
    particles of a first ion conducting polymer, a majority of the particles of the first ion conducting polymer having diameters greater than 1 µm; and
    particles of a second ion conducting polymer, a majority of the particles of the second ion conducting polymer having diameters less than 40 nm.
Embodiment 92 is the method of embodiment 22, wherein the ionic conductor comprises:
    particles of a first ion conducting polymer, a majority of the particles of the first ion conducting polymer having diameters greater than 1.5 µm; and
    particles of a second ion conducting polymer, a majority of the particles of the second ion conducting polymer having diameters less than 40 nm.
Embodiment 93 is the fuel cell subassembly of embodiment 48, wherein a majority of the particles have diameters in a range of 1 µm to 15 µm.
Embodiment 94 is the fuel cell subassembly of embodiment 48, wherein a majority of the particles have diameters in a range of 1.5 µm to 15 µm.
Embodiment 95 is the fuel cell subassembly of embodiment 48, wherein a majority of the particles have diameters in a range of 1 µm to 12 µm.
Embodiment 96 is the fuel cell subassembly of embodiment 48, wherein a majority of the particles have diameters in a range of 1.5 µm to 12 µm.
Embodiment 97 is the fuel cell subassembly of embodiment 56, wherein the second ionic conductor comprises particles, and a majority of the particles of the second ionic conductor have diameters less than 50 nm.
Embodiment 98 is the fuel cell subassembly of embodiment 56, wherein the second ionic conductor comprises particles, and a majority of the particles of the second ionic conductor have diameters less than 40 nm.
Embodiment 99 is the fuel cell subassembly of embodiment 56, wherein a majority of the particles have diameters in a range of 1 µm to 15 µm, wherein the second ionic conductor comprises particles, and wherein a majority of the particles of the second ionic conductor have diameters less than 50 nm.
Embodiment 100 is the fuel cell subassembly of embodiment 56, wherein a majority of the particles have diameters in a range of 1 µm to 15 µm, wherein the second ionic conductor comprises particles, and wherein a majority of the particles of the second ionic conductor have diameters less than 40 nm.
Embodiment 101 is the method of embodiment 22, wherein at least 10% of the particles are hollow.
Embodiment 102 is the method of embodiment 22, wherein at least 20% of the particles are hollow.
Embodiment 103 is the method of embodiment 22, wherein at least 30% of the particles are hollow.
Embodiment 104 is the method of embodiment 22, wherein at least 40% of the particles are hollow.

The foregoing description of the various examples and embodiments has been presented for the purposes of illustration and description. It is not intended to be exhaustive or to limit the invention to the precise forms disclosed. Many modifications and variations are possible in light of the above teaching. It is intended that the scope be limited not by this detailed description, but rather by the claims appended hereto.

We claim:
1. A fuel cell electrode layer, comprising:
    a catalyst;
    a plurality of connected electronic conductor rich networks comprising a first electronic conductor within the electrode layer; and
    a first ionic conductor; and
    a second ionic conductor, wherein the first and second ionic conductors are each polymers,
wherein the first ionic conductor is different from the second ionic conductor and the first ionic conductor and the second ionic conductor are interspersed with each other, the electronic conductor, and the catalyst within the electrode layer, and wherein the first ionic conductor comprises particles a majority of which have a diameter greater than about 1 µm and the second ionic conductor comprises particles a majority of which have a diameter less than about 50 nm.

2. The electrode layer of claim 1, wherein the first ionic conductor and the second ionic conductor are different types of ionic conductor.

3. The electrode layer of claim 1, wherein the first ionic conductor and the second ionic conductor are different forms of the same type of ionic conductor.

4. The electrode layer of claim 1, wherein the first ionic conductor has a first equivalent weight and the second ionic conductor has a second, different equivalent weight.

5. The electrode layer of claim 1, wherein a majority of particles of the first ionic conductor are powdered spray dried particles or powdered cryoground particles.

6. The electrode layer of claim 1, wherein particles of the first ionic conductor are non-uniformly distributed in the electrode layer and particles of the second ionic conductor coat the electronic conductor.

7. A fuel cell electrode layer, comprising:
a catalyst;
a plurality of connected electronic conductor rich networks comprising a first electronic conductor within the electrode layer; and
a first ionic conductor; and
a second ionic conductor, wherein the first and second ionic conductors are each polymer,
wherein the first ionic conductor is different from the second ionic conductor and the first ionic conductor and the second ionic conductor are interspersed with each other, the electronic conductor, and the catalyst within the electrode layer, and wherein the first ionic conductor comprises particles, and a majority of the particles of the first ionic conductor are substantially smooth and hollow.

8. The electrode layer of claim 7, wherein the first ionic conductor and the second ionic conductor are different types of ionic conductor.

9. The electrode layer of claim 7, wherein the first ionic conductor and the second ionic conductor are different forms of the same type of ionic conductor.

10. The electrode layer of claim 7, wherein the first ionic conductor has a first equivalent weight and the second ionic conductor has a second, different equivalent weight.

11. The electrode layer of claim 7, wherein a majority of particles of the first ionic conductor are powdered spray dried particles or powdered cryoground particles.

12. The electrode layer of claim 7, wherein particles of the first ionic conductor are non-uniformly distributed in the electrode layer and particles of the second ionic conductor coat the electronic conductor.

\* \* \* \* \*

UNITED STATES PATENT AND TRADEMARK OFFICE
CERTIFICATE OF CORRECTION

| | | |
|---|---|---|
| PATENT NO. | : 8,765,327 B2 | Page 1 of 1 |
| APPLICATION NO. | : 12/834531 | |
| DATED | : July 1, 2014 | |
| INVENTOR(S) | : Andrew Haug et al. | |

It is certified that error appears in the above-identified patent and that said Letters Patent is hereby corrected as shown below:

In the Claims

Column 29
Line 8, in Claim 7, delete "polymer," and insert -- polymers, --, therefor.

Signed and Sealed this
Fourteenth Day of October, 2014

Michelle K. Lee
*Deputy Director of the United States Patent and Trademark Office*